United States Patent [19]

Stark

[11] 4,323,052

[45] * Apr. 6, 1982

[54] SOLAR ENERGY SYSTEM

[76] Inventor: Virgil Stark, 936 Fifth Ave., New York, N.Y. 10021

[*] Notice: The portion of the term of this patent subsequent to Jun. 2, 1998, has been disclaimed.

[21] Appl. No.: 44,901

[22] Filed: Jun. 4, 1979

Related U.S. Application Data

[63] Continuation-in-part of Ser. No. 1,175, Jan. 5, 1979, abandoned, which is a continuation-in-part of Ser. No. 915,001, Jun. 13, 1978, and Ser. No. 920,288, Jun. 29, 1978.

[51] Int. Cl.³ .......................... F24J 3/02; B01D 3/02
[52] U.S. Cl. .................................. 126/440; 136/246; 136/259; 202/174; 203/DIG. 1; 126/417; 126/444
[58] Field of Search ............... 126/440, 444, 432, 417; 136/89 PC, 89 HY; 202/172, 267 A, 267 R, 163, 174; 203/DIG. 1

[56] References Cited

U.S. PATENT DOCUMENTS

| | | | |
|---|---|---|---|
| 102,633 | 5/1980 | Wheeler | 202/DIG. 1 |
| 1,302,363 | 4/1919 | Graham | 203/DIG. 1 |
| 1,599,481 | 9/1926 | Marcuse | 126/440 |
| 1,683,266 | 9/1928 | Shipman | 126/440 |
| 1,704,173 | 3/1929 | Chesney . | |
| 1,951,403 | 3/1934 | Goddard | 126/440 |
| 2,249,642 | 7/1941 | Turner | 203/DIG. 1 |
| 2,445,350 | 7/1948 | Ginnings | 203/DIG. 1 |
| 2,636,124 | 4/1953 | Agnew | 203/DIG. 1 |
| 2,788,316 | 4/1957 | Bjorksten | 203/DIG. 1 |
| 2,902,028 | 9/1959 | Manly | 126/440 |
| 3,088,882 | 5/1963 | Justice | 202/234 |
| 3,104,210 | 9/1963 | Mount | 203/DIG. 1 |
| 3,159,554 | 12/1964 | Mount | 202/234 |
| 3,190,816 | 6/1965 | Ademac | 202/234 |
| 3,192,133 | 6/1965 | Ademac | 202/234 |
| 3,314,862 | 4/1967 | Hay | 202/234 |
| 3,317,406 | 5/1967 | Beard | 202/180 |
| 3,330,740 | 7/1967 | Duffy | 202/234 |
| 3,351,538 | 11/1967 | Mount | 203/DIG. 1 |
| 3,428,529 | 2/1969 | Gumucio | 203/10 |
| 3,655,517 | 4/1972 | Hensley, Jr. et al. | 202/234 |
| 3,738,734 | 6/1973 | Tait et al. | 350/179 |
| 3,886,998 | 6/1975 | Rowekamp | 165/2 |
| 3,915,147 | 10/1975 | Rimeer | 126/440 |
| 3,965,683 | 6/1976 | Dix | 350/179 |
| 3,970,070 | 7/1976 | Meyer et al. | 126/440 |
| 3,986,936 | 10/1976 | Rush | 202/234 |
| 3,991,741 | 11/1976 | Northrup et al. | 350/211 |
| 4,002,031 | 1/1977 | Bell | 126/440 |
| 4,011,857 | 3/1977 | Rice | 126/440 |
| 4,022,186 | 5/1977 | Northrup | 350/211 |
| 4,057,048 | 11/1977 | Maine | 126/440 |
| 4,058,110 | 11/1977 | Holt | 126/440 |
| 4,075,063 | 2/1978 | Tsay et al. | 203/DIG. 1 |
| 4,081,289 | 3/1978 | Campbell | 136/89 |
| 4,134,392 | 1/1979 | Livermore et al. | 126/271 |
| 4,134,393 | 1/1979 | Stark et al. | 126/424 X |
| 4,187,123 | 2/1980 | Diggs | 126/440 X |

FOREIGN PATENT DOCUMENTS

| | | | |
|---|---|---|---|
| 41-3860 | 3/1966 | Japan . | |
| 50-128001 | 5/1975 | Japan . | |
| 51-2043 | 9/1976 | Japan . | |
| 53-10031 | 4/1978 | Japan | 202/234 |
| 590431 | 5/1976 | Switzerland . | |
| 590437 | 8/1977 | Switzerland | 126/440 |
| 1172829 | 12/1969 | United Kingdom . | |

*Primary Examiner*—James C. Yeung
*Assistant Examiner*—Larry Jones

[57] ABSTRACT

Disclosed are solar energy systems which provide for the distillation of liquids and/or the production of electricity using photovoltaic cells. Apparatus are disclosed which include an undulated system for conducting the liquid to be distilled, a linear lens disposed to concentrate solar energy on or below the undulated system, and a conduit transparent to visible light interposed between the undulated system and the linear lens. A cooling fluid is supplied to the conduit for assisting condensation of liquid evaporated from the undulated system on the lower wall of the conduit. The condensed liquid, the condensate and a concentrate of the liquid being distilled are collected. An array of photovoltaic cells may be disposed in the undulated system at a location of the concentration of solar energy to thereby provide for both distillation of the liquid and generation of electricity. Instead of an undulated system for conducting the liquid to be distilled, in one embodiment, a first transparent tube is disposed in a second transparent tube. The liquid to be distilled evaporates in the first transparent tube and is condensed on the upper wall thereof which has an outer surface in contact with the cooling fluid. If desired, photovoltaic cells may also be disposed in the first transparent tube. In another disclosed embodiment, a collector comprises tubes one disposed in the other with a fluid being circulated through each tube and insulation surrounding the lower portion of the tubes. Photovoltaic cells may be disposed in the innermost tube which is transparent.

36 Claims, 27 Drawing Figures

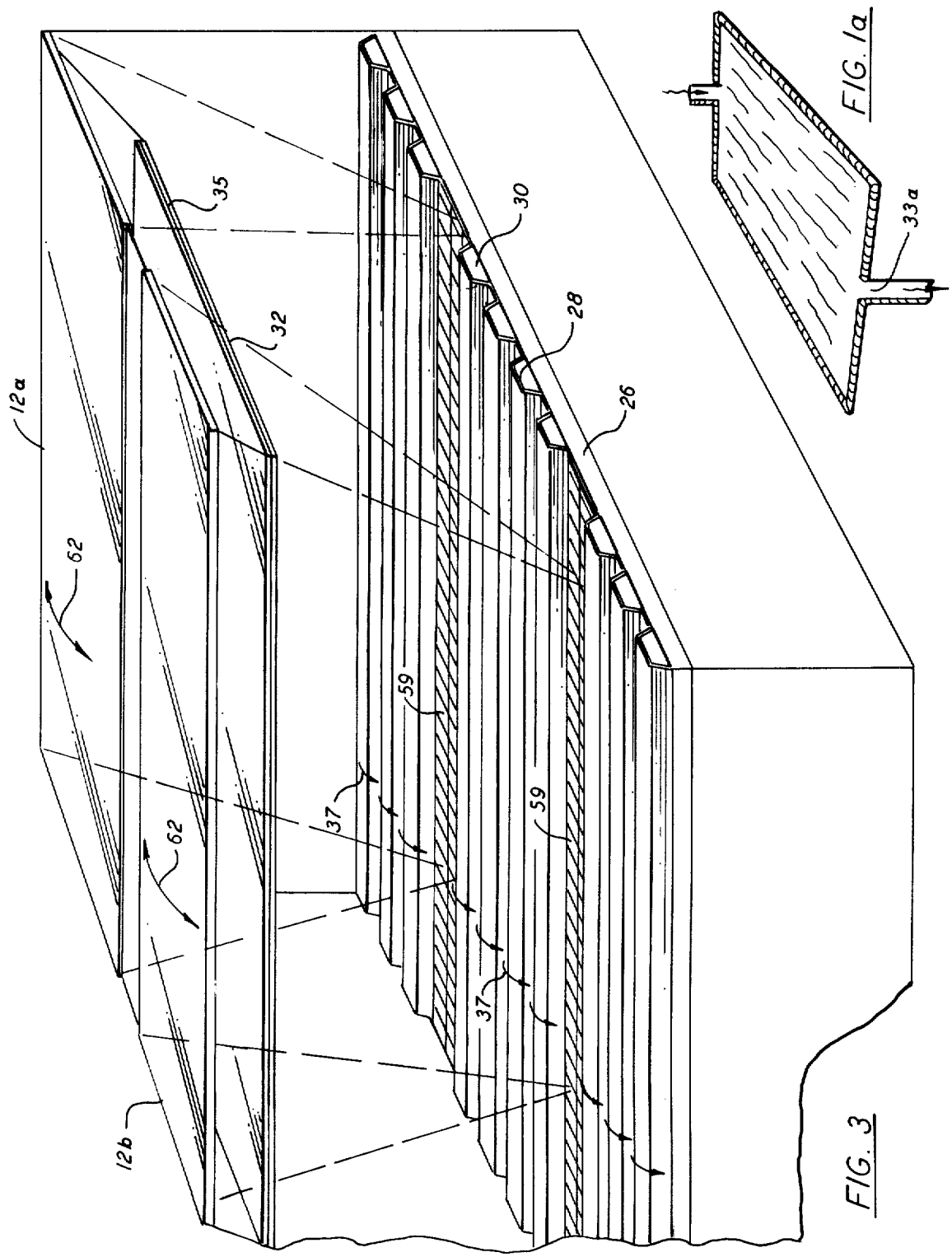

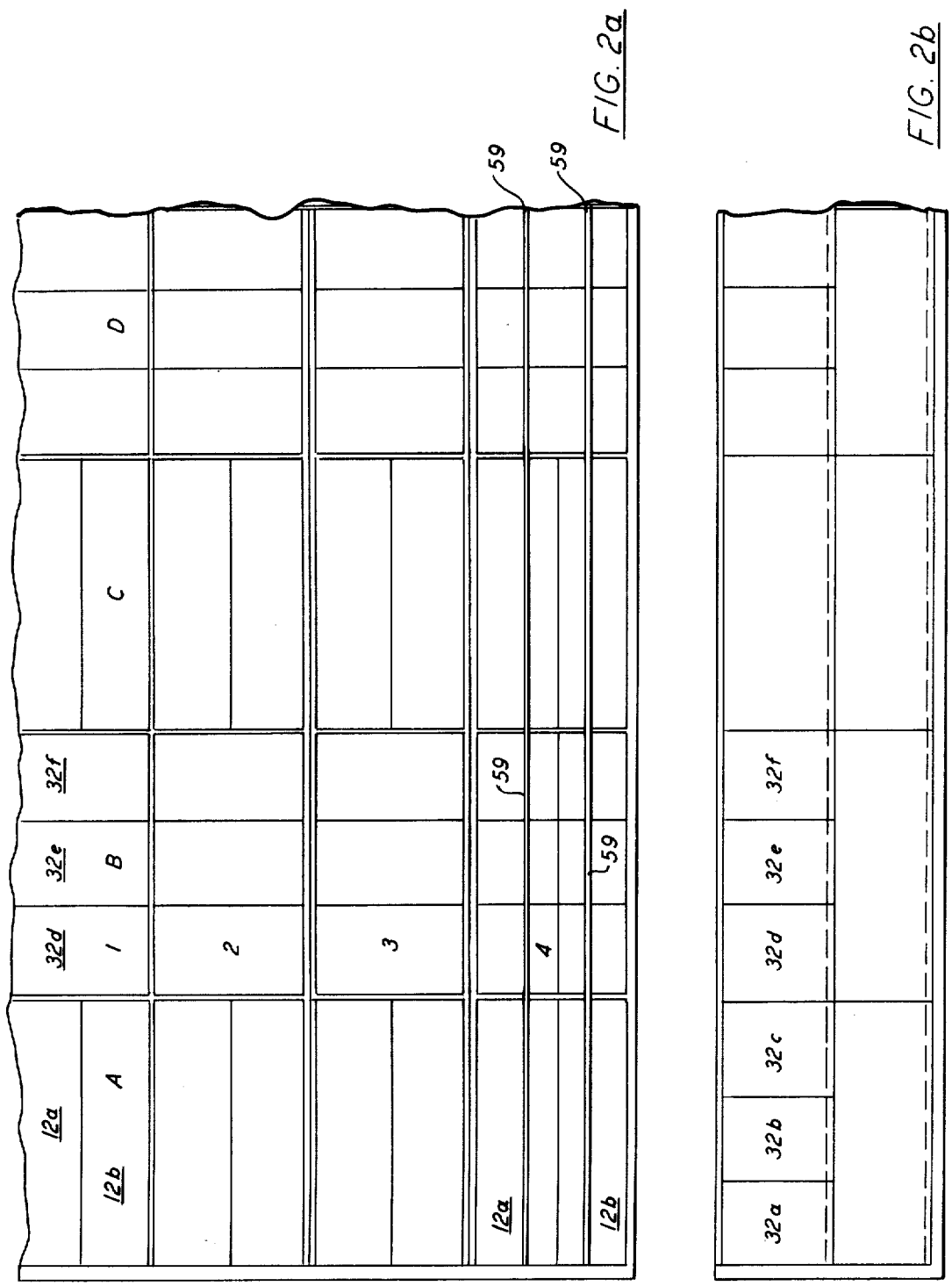

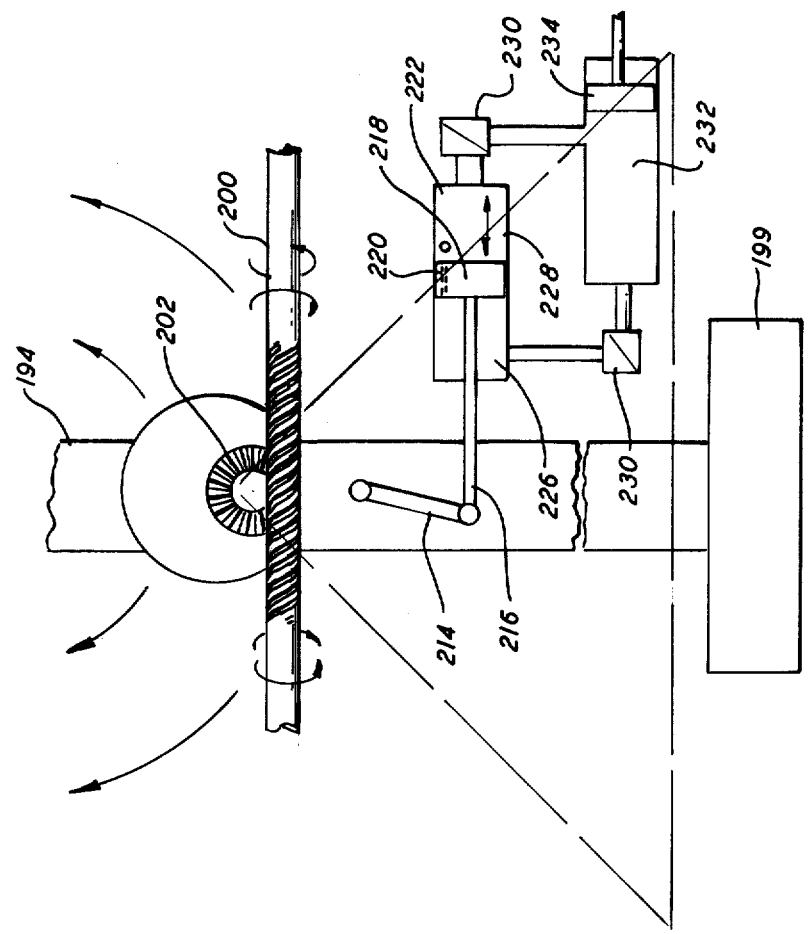
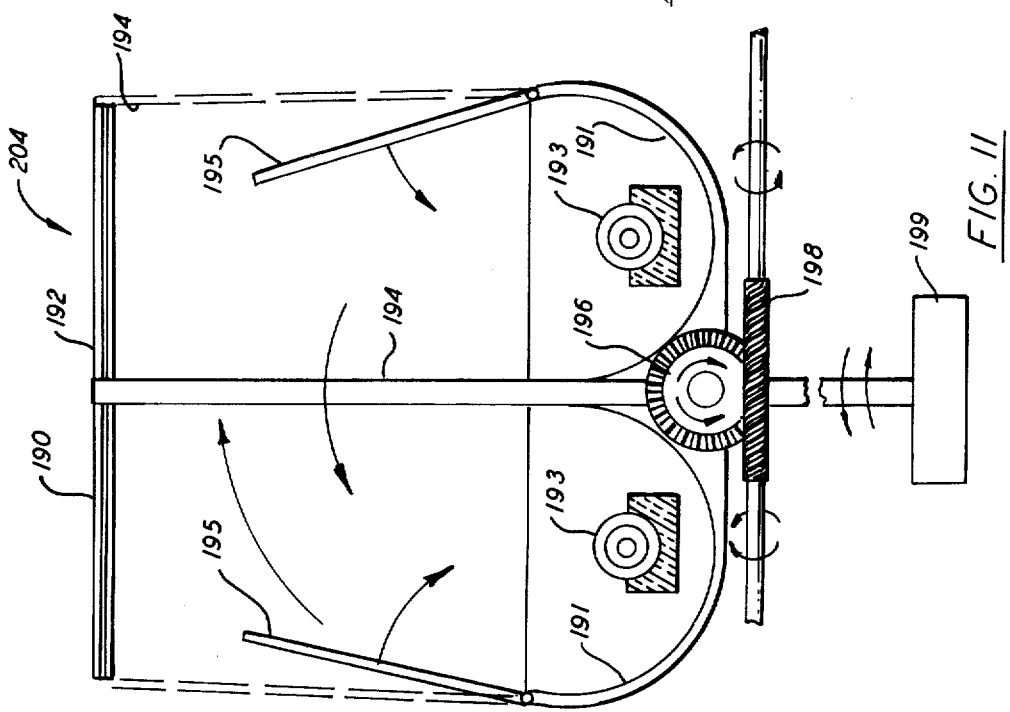
FIG. 12
FIG. 11

SOLAR ENERGY SYSTEM

RELATED APPLICATIONS

This application is a continuation-in-part of my co-pending application Ser. No. 1,175 filed Jan. 5, 1979, now abandoned which is a continuation in-part of my co-pending applications Ser. Nos. 915,001, filed June 13, 1978 and 920,288, filed June 29, 1978, the disclosure of which is hereby incorporated by reference.

BACKGROUND OF THE INVENTION

This invention relates to a solar energy system in general and more particularly to solar energy system utilizing lens systems to concentrate the rays of the sun.

In U.S. Pat. No. 4,134,393, of which I am a co-inventor and the sole assignee, and in pending application Ser. No. 807,513 filed June 20, 1977 and Ser. No. 845,862 filed Oct. 31, 1977 (now U.S. Pat. No. 4,194,948), of which I am sole inventor, solar energy distillation apparatus are disclosed in which a part of the heat of condensation of the condensing liquid is recovered. In the disclosed embodiments in those applications, the heat of condensation is transferred to a fluid in a fluid lens disposed over the liquid to be distilled inclined to provide a bottom surface on which the evaporated liquid is condensed and flows to be discharged fromthe lower end thereof.

At locations where a lens inclination of greater than 20° is desirable to increase collection, the system operates at reduced efficiency since the fluid lens is limited to angles of inclination of less than about 20°.

Fluid lenses also have other drawbacks, which in accordance with my appliction Ser. No. 915,001, filed June 13, 1978, are substantially overcome and improved solar energy distillation apparatus obtained by providing solar distallation apparatus in which the solar energy is concentrated inthe liquid to be distilled and double plate conduit means, with an upper and a lower wall between which a heat exchange fluid flows are provided to condense the evaporated liquid vapor on a surface thereof, the conduit means being disposed intermediate the liquid to be distilled and lens means for concentrating the solar energy in the liquid.

The concentrated solar energy causes the liquid to evaporate with the vapor impinging and being condensed upon the outer surface of the lower wall of the conduit means, the condensed liquid flowing along the outer surface of the lower wall to the lower end thereof and falling therefrom into a container, a substantial part of the heat of condensation of the condensing vapor being absorbed by the fluid in the conduit means.

According to one embodiment of Ser. No. 915,001, the lens means comprise a plurality of sets or series of Fresnel-type lenses arranged to provide an elongated narrow focus. The container includes a plurality of baffles dividing the container interior into a plurality of distillation compartments for the liquid to be distilled and is inclined so that the compartments are offset in height. The elongated focus of each series of Fresnel lenses may therefore be located in and along a different compartment.

An expansion tank for the heat exchange fluid in the conduit is located so as to provide minimal pressure within the conduit.

A heat exchanger is also provided to transfer the heat recovered in the heat exchange fluid circulated in the conduit to the liquid being introduced into the container to preheat the liquid. The heat exchanger is also located to minimize pressure in the conduit.

In accordance with another disclosed embodiment of Ser. No. 915,001, the sets of Fresnel lenses are arranged so that the elongated focus of at least one set is substantially parallel to the axes of the compartments in the container and the elongated focus of at least one other set is arranged so that the elongated focus is transverse to the axes of the compartments and extends into varying depths of liquid in the container. The two sets of Fresnel lenses are arranged at an angle to each other so that they meet along an apex with each set having a lower end.

According to another aspect of that disclosure, the bottom of the compartment containing the liquid to be distilled is blackened to allow absorption of solar energy and enhance the heating of the liquid.

Furthermore, in my co-pending application Ser. No. 920,288 filed June 29, 1978, solar energy is concentrated by lens means in an elongated focus located substantially in or on the surface of, and substantially along at least one conduit system by a lens means which is pivoted at least about a first axis of the least one conduit. The conduit system includes an inner conduit enclosed by an enclosure with the enclosed inner conduit and enclosure enclosed by an outer conduit. A collector having inner and outer conduits which are transparent at least in part with photovoltaic cells disposed in the inner conduit and a fluid which absorbs substantial amounts of infrared solar energy circulated in the outer conduit is utilized.

In accordance with Ser. No. 920,288, the apparatus is disposed so the first axis extends generally in the North-South direction, so that the lens means can track the sun on a daily basis, the conduit remaining stationary as the lens means is pivoted.

According to that disclosure, the lens means comprises at least one Fresnel lens having prisms extending substantially parallel to the first axis.

In one embodiment disclosed therein the apparatus comprises a plurality of adjacently disposed collectors and a plurality of adjacently disposed lens means. According to this embodiment, the lens means and collectors are pivoted about an axis only on a daily basis with the at least one conduit remaining stationary regardless of season.

In accordance with still another aspect of that invention, an elongated conduit system for collecting solar energy in an elongated focus is provided in which the elongated focus is located substantially in or on and substantially along the conduit system, which comprises two elongated conduits for passing fluids therethrough and an enclosure for a first of the conduits, the conduits and enclosure being disposed so that an inner of the conduits containing a fluid therein is enclosed by the enclosure, there being a dead space in the enclosure surrounding the inner conduit, and an outer of the conduits containing a fluid therein encloses the enclosure and inner conduit, at least part of the enclosure and outer conduit being transparent with transparent portions thereof being aligned and adapted to transmit the solar energy in the elongated focus therethrough. The inner conduit is opaque with a darkened outer surface and the dead space in the enclosure preferably contains air, the elongated focus being located substantially on and substantially along the outer surface of the inner conduit which absorbs the solar energy and transmits heat to the fluid therein. In the preferred embodiment, the inner conduit comprises metal piping and the enclosure and outer conduit comprise glass tubing. The inner and outer conduits carry heat exchange fluids while the dead space around the inner conduit provides insulation for the fluid therein.

According to an aspect of my previous application Ser. No. 920,288, photovoltaic cells which produce electricity from luminous solar energy of about 0.4 to about 0.7 microns wavelength are installed in an inner conduit which is transparent at least in part of an elongated collector. The elongated focus of a Fresnel lens is located on the cells in the inner conduit. The inner conduit is enclosed by an outer conduit which is transparent at least in part.

This arrangement increases the production of electricity by the photovoltaic cells since their efficiency is not substantially reduced by the heat that would be generated by infrared solar energy otherwise reaching the cells. In the preferred embodiment, the fluid is water.

SUMMARY OF THE INVENTION

It is the object of the present invention to improve the efficiency of systems of the above described nature.

In accordance with one embodiment of the present invention which constitutes an improvement on the distillation apparatus of the aforementioned Ser. No. 915,001, what in the embodiment thereof were relatively large and deep distillation compartments are replaced by an undulated plate or plurality of adjacent plates on top of an insulating base.

In accordance with a further feature of this embodiment of the present invention, a single panel or plurality of adjacent panels made of blackened flexible plastic or the like, such as isobutyl, are disposed over all or bottom part of the plates. They are to be attached to the plates in a removable manner which will permit taking them out to remove deposits which may form on them.

Furthermore, as described above, it is preferred that the undulated plates be placed above the focal area of maximum concentration obtained from the Fresnel lenses. This permits a wider spread of the heat converging from the lens on the undulated plates so that a wider area of the plates is heated. Another feature of this embodiment is to allow the fluid circulating between the double plates located between the Fresnel lenses and the distilling basin with undulated plates to spread all along the surface between the double plates and to selectively regulate the quantity of fluid circulating, thus controlling the temperature of the fluid by restricting the bottom passage of the section at an extreme end of the plates leaving a small opening for relasing the fluid.

In the same type of system, in accordance with another feature of the present invention photovoltaic cells are installed in one or more bottoms or valleys of the undulated plates at the locations where the focus area of the Fresnel lens are most concentrated. As in my previously disclosed systems, the lenses are supported for movement to track the location of the sun using either the system described in my previous applications or systems to be described in more detail herein. Again, as with my other system, although Fresnel lenses are preferred for a number of reasons, liquid lenses may also be used.

With such an arrangement the photovoltaic cells will produce electricity at the minimal additional cost avoiding the cost which would be associated with a separate solar installation for producing electricity. Furthermore, where concentration of solar energy is used as is the case with the present invention, the production of electricity can be up to for instance 40 times that which it would be without concentration. For example, the average yearly production of electricity with concentration will be, for example 3 Watts per cell of, for example, 5 cm × 5 cm, compared with about 0.06 Watts per cell for cells exposed to the sun without concentration. Cost estimates have shown that installing an array of photovoltaic cells in a distillation unit of the present invention permits saving all of the cost of the solar system otherwise required by the photovoltaic cells. Put another way, it reduces by about half the total cost of the photovoltaic cell system when the solar system need to concentrate the solar energy is considered. Thus, the present solar energy system uses a single concentrating means, i.e., lens system, which supplies energy both for distillation and for generating electricity.

Furthermore, the absorption of infrared rays by the fluid in the conduit means and by the water being distilled which circulates above and around the photovoltaic cells permits the production of electricity at higher efficiencies. As temperature goes up the efficiency of silicon photovoltaic cells goes down. At a temperature of 200° C. the efficiency is zero, and the cells melt. However, because of the absorption of the infrared radiation by the circulating fluid and by the water being distilled, temperatures are maintained lower.

The photovoltaic cells can preferably be encapsulated in a transparent plastic or glass cover of similar shape either rectangular or round so as to protect the cells from saline water which will flow above such cover. The cells can also be enclosed in a transparent tube in which distilled water such as cooled condensate produced by a distillation unit can circulate and further absorb heat generated by the infrared rays. Such a heat exchange can reduce the temperature of the condensate from about 75° C. to, for example, about 30° C. With this arrangement, heated salt water will not flow around the photovoltaic cells and form deposits thereon. And, furthermore, the cells instead of being surrounded by fluid at a temperature of up to 75° C., will be surrounded by fluid at a temperature of only, for example 40° C. The efficiency of electricity production is generally reduced by about 0.4% for every degree C. increase in temperature above, for example, 30° C. By encapsulating or enclosing the cells and circulating cooling water around them, the cells will be maintained at their optimum temperature for efficiently producing electricity and at the same time the cells will be protected from any corrosion effects of the salt water or salt deposits. Such encapsulation and circulation of condensate may be used in any of the embodiments subsequently discussed, which employ solar cells.

Furthermore, as previously disclosed in the aforementioned Ser. Nos. 915,001, and 920,288 it is preferred that the lenses track the sun. Preferably, such tracking will be done only for the elevation around a North-South axis. The deviation for seasonal locations of the sun of a maximum angle of 23.5° C. from equinox to solstice will take place on each side of the central axis of the focal line without elevation tracking. The seasonal changes will be along the axis of the focal line if elevation tracking is provided. Elevation tracking can be provided by moving the lens about the axis of the focal line oriented along a North-South axis. Care should be taken that the distances between the lenses are such that no lens shades the adjoining one as they are tilted.

As disclosed in my previous applications, a central station with electric cells or other means such as special clocks, a computer or the like can be utilized to activate an electric motor which will move a series of lenses to be oriented by pulleys and chains or other means. Such apparatus is disclosed in my aforementioned Ser. No. 920,288.

Much in the manner disclosed in the aforementioned Ser. No. 915,001 series of linear Fresnel lenses which are arranged alternately along the North-South and East-West axes may be used.

In accordance with a further embodiment of the present invention an improved method of tracking is provided. In accordance with this embodiment of the invention the Fresnel lenses or fluid lenses are enclosed in frames which are preferably metallic such as anodized aluminum or steel, or the like. Each of the frames have mounted thereon, at each corner thereof, small wheels, ball bearing tracks, or similar means which ride in a rail system having a sinusoidal shape. The linear Fresnel, or fluid lenses in the frame are spaced and coupled together in such a manner that they move together so that, all lenses will be at the same position, i.e., all lenses at the peak of the sinusoidal track, or all lenses on one side of the peak or the other. By moving the lenses from one side of the peak over to the other, it is possible to easily track the sun from East to West. The same type of control means as described in my aforementioned Ser. No. 920,288 can be used for operating motors driving cables which move all of the lens frames in unison. Unlike the systems previously disclosed in my Ser. No. 920,288 where large masses needed to be moved about an axis, with the tracking system of the present invention, only a relatively small force is required since a large part of the mass of the lenses and frames is supported on the wheels, and such mass is reduced by the gravity when tilted downward. The specific shape of the rails will be tailored to the specific local orientation required during the day. Preferably the frames, at the end of the day, will be moved through their initial position, i.e., pointing East to be ready to start collecting energy in the morning simply through the use of the reset switch activating an electric motor which drives in reverse.

The above system is independent of the requirement of an axis for rotation of the lenses which in some systems is spaced as much 40" from the lenses. In the present embodiment, the height of the railing above the horizontal will be much smaller and the capacity of the electric motor, for the reasons noted above, will be correspondingly smaller.

This tracking system can be used both with the double plate system and with systems using concentric conduits. Furthermore, more than one lens can be mounted in a single frame.

In accordance with another feature of the present invention, provisions are made to recirculate the brine obtained in the distillation apparatus both during the day and night and on days without sunshine. The brine obtained at the output of the distillation apparatus will typically be at a temperature of 80° C. and its quantity will be for instance eight times as large as the water vaporized by solar energy alone. Furthermore, as previously disclosed in my aforementioned application Ser. No. 915,001 larger quantities of the fluid carried in the conduit against which the evaporated water condenses are also required to maintain condensation and carry away that heat. For example, the fluid circulating in the conduits will typically be heated from 30° C. to 65° C. by the vapor from the water being distilled which is at about 75° C. The quantity of heat which is recovered by this fluid may be approximately 3200 kcal/m²/day. The fluid circulating in the conduits after being heated from 30° to 65° C. must be cooled back down to 30° C. before it is recirculated. This cooling is carried out by the water which is being distilled. Thus, in order to bring about a temperature drop of 35° C. and to remove the heat which is recovered by this fluid, it is necessary that the amount of water being distilled equal 3200 divided by $35 = 91.4$ Liters/m²/day. It requires 540 kcal/Liter plus the sensible heat, for instance 580 kcal/Liter to evaporate one liter of water. Solar energy of, for example 3200 kcal/m²/day would be produced, at 580 kcal/L, about 5.5 liters/m²/day, plus the heat recuperated from the condensation. The preheating of the water being distilled will be, for example, from 20° C. to 35° C. The quantity of distilling water will be the quantity noted above, i.e., 91.4 Liters/m²/day. Assuming an evaporation including incorporation of heat of about 10 Liters/m²/day, the quantity of the brine will be of the order of 81 L/m²/day.

As noted, the brine, after passing through the distillation apparatus will have a temperature of approximately 80° C. More of the water in the hot brine can be evaporated reducing the temperature of the brine, for example, from 80° C. to 40° C. and thus producing additional distilled water, either during the day, in another adjacent unit, (adding solar energy for further evaporation) or during the night, or days without sunshine by recycling the brine, instead of the salt water, and recuperating a part of its heat. Brine released during the nights at for instance 55° C. can be added to the salt water in order to recover part of this heat. The production of distilled water will be greatly increased and its price reduced by such a measure.

Through recycling of the brine, salt can be extracted therefrom with an increased salt content after several recyclings. For example, a recovery of over 10%, as opposed to the initial salt content of 3.5% is possible. Chemicals such as sodium chloride (for example 27000 ppm) natrium chloride, magnesium chloride (for example 3600 ppm), magnesium sulfate (for example 1600 ppm) etc., could be obtained.

In accordance with a further feature of the present invention, provisions are made to store the fluid circulating in the conduit, the brine and the condensate, all in selected quantities, in the space below the insulated panel on which the undulated plates rest. By storing these fluid beneath the insulated plate, further insulation is provided reducing heat losses.

In lieu of the undulated plate, an embodiment similar to that in my aforementioned application Ser. No. 920,288 in which the photovoltaic cell arrays are installed inside of a transparent glass or plastic tube, inserted in another transparent glass or plastic tube may be used. Salt water or brine flows over and around the array of photovoltaic cells in the inner tube. The focus from the Fresnel or fluid lens will preferably be under the inner tube so that the area of solar rays is spread all over and concentrated on the photovoltaic cells. Vapor resulting from the evaporation of the salt water or brine condenses on the inside walls of the inner tube which is preferably tilted at the angle of the latitude of location plus 10°. Condensate flows along the inside wall of the tube and is collected in a container at its outlet. A fluid such as distilled water circulates between the inside tube and the outside tube to recover the heat of condensation. Furthermore, in the manner described above, the fluid will absorb most of the infrared rays allowing transmittance of most of the visible rays which are the only ones which produce electricity in the voltaic cells. The condensate also absorbs infrared solar rays and heats the circulating fluid which heat is recovered in the manner described above. Encapsulation of the cells and cooling with condensate may be also accomplished as above.

Heated fluid which flows between the tubes then flows into a collector and this heat can be used for preheating the salt water, for example. The brine flows into another collector and can be recycled in the manner described above.

In accordance with another feature of this embodiment of the invention, the Fresnel lenses or fluid lenses which concentrate the solar energy on the photovoltaic cells are supported for rotation to follow the East-West movement of the sun. The point of rotation is preferably about the focus of the lens. The tube is supported above a member on the inside of which there is a reflective coating such as aluminized paint or sheet to reflect solar rays and increase irradiation.

The whole structure, save the tubes, moves around an axis located along the center axis of the tube. A counterweight is provided so that the weight of the Fresnel lens and its frame and support times the distance from the lens to the axis of rotation will be similar to the weight of the counterweight times its distance to the axis to permit a minimum effort of rotation. The counterweight can be either of steel or provided in the form of a container filled with a heavy low cost material such as sand or concrete. A plurality of such units can be disposed adjacent each other and moved by a central unit and electric motor as previously described in my aforementioned application Ser. No. 920,288.

Once again, this combination permits water distillation combined with the production of photovoltaic cells without the use of the panel or plates of distilling apparatus used in the other embodiments, but using simply concentric tubes instead.

In accordance with another embodiment of the present invention, a conduit assembly such as the disclosed in my aforementioned application Ser. No. 920,288 and as described above, is surrounded by longitudinal mirrors having the necessary forms and sizes to carry out optiminzation of the collection of solar radiation. In this embodiment, incoming solar radiation is reflected by a first group of mirrors to a cylindrical mirror disposed above a Fresnel lens. The cylindrical mirror reflects radiation through the Fresnel lens which concentrates the radiation on the conduit system. The mirrors reflecting energy to the cylindrical mirror surround the conduit system and additional energy therefrom is reflected to the conduit system further concentrating the energy.

As with the previous embodiments, photovoltaic cells can be installed inside the inner tube of such a system. As with the previous embodiments described, this embodiment can be used in a heating system or a distillation system with or without photovoltaic cells.

Furthermore, as with other embodiments, the system of mirrors and Fresnel lens is supported for rotation about a longitudinal axis coinciding with the axis of the inner tube in order to track the movement of the sun from East to West. The tube assembly is fixed and does not move with the mirrors and Fresnel lens. With this system, increased radiation above that with simply a Fresnel lens is achieved through the used of mirrors. The concentration of solar energy in a focus area will be much higher, thus making this embodiment of special interest to the production of electricity from photovoltaic cells, since, as noted above the electricity production is almost directly proportional to concentration.

As is the case in the other embodiments, the fluid circulating between the conduits acts to absorb infrared radiation to maintain the photovoltaic cells at a low temperature. Furthermore, as with all embodiments of the present invention, fluid lenses rather than Fresnel lenses may be provided.

In accordance with a further embodiment of the invention, a tubular conduit consisting of two or more tubes such as disclosed in my aforementioned applications, is disposed above a semicylindrical or parabolic reflecting surface. A Fresnel lens of large size, for instance of aperture up to 860 mm, is disposed above the tube assembly and acts to concentrate the rays of the sun, not only on the tube assembly, but also on the surfaces of the structure below the tube assembly which is mirrored. The focus of the lens is located below the mirrored surface. As a result, energy is concentrated both from above, i.e., direct rays from the lens, and from below, rays which are reflected from the mirrored surface. As with other embodiments, the structure including the lens and mirrored surface is rotated about the axis of the tube assembly to track the sun.

This embodiment is particularly useful for several applications. For example, in the case of a triple conduit system including an inner metallic conduit, it can heat a fluid circulating in the inside metallic conduit up to a temperature of 300° C. Secondly, it can be used for distilling water circulating in a transparent inner conduit as in previously discussed embodiments with vapor condensing on the inside of the conduit. Furthermore, as in previously discussed embodiments, photovoltaic cells may be provided inside a transparent conduit to produce electricity. Finally, the combination of distillation of water and production of electricity is possible. With this arrangement, the insulating collector which otherwise surrounds the tube assembly can be eliminated. When used for heating a fluid in the inner conduit, the fluid between the outer conduits will be circulated in a selective manner to absorb heat emitted by the fluid in the inner conduit, or by the solar rays reflected on the conduits, and will have a predetermined temperature of, for example, 75° C. so as to limit heat losses.

Another embodiment of the invention provides reflective parabolic longitudinal mirrors of adequate shape, preferably made out of thin waterwhite glass or similar reflective material. The solar rays will be reflected onto one or more tube assemblies of two or three tubes inserted one in another with fluids circulating in the inside tube and between the outside and inside tubes. Provisions can be made to insert photovoltaic cells in the inside tube. Distillation of water can be provided as described above. Fresnel glass lenses of large aperture such as 84 cm wide and 240 cm large have excellent solar energy transmission of about 90% only in the middle; thereafter the transmission is successively lower such as to about 80% and thereafter lower, for example 65–70% at the extreme ends. It is of interest to have Fresnel lenses of smaller aperture for instance 60 cm instead of 84 cm (24" instead of 34") with an average solar energy transmission of about 85%.

In a further embodiment of the present invention several Fresnel lenses of 60 cm each for example, are installed adjacent each other on the same rotating frame and supports. The collector tube assembly is stationary and the tubes then connected in series so that the fluid circulating in the tubes is progressively heated from one tube to higher temperatures in the adjacent tube. The mirrors under the tube assemblies are connected together and rotated with the Fresnel lenses by a worm gear drive. Scattered solar rays from one set of lenses may be incident either on one mirror or partially on an adjacent one. Both the tube assemblies and insulation and the worm gear drive will remain stationary.

A further embodiment of the present invention includes providing a shock absorber or other means in case of high winds or gusts of winds acting on the rotating Fresnel lens which might otherwise destroy the rotation means which follow the East-West location of the sun.

The worm gear drive is activated by an electric motor having, as a sensor, electric cells. The worm gear acts on a circular gear with sockets attached to the supports moving the Fresnel lens system, mirrors and the counterweight.

A stationary cylinder in which a piston is provided is connected to the worm gear; the cylinder is separated into two chambers each containing a fluid. At least one orifice is provided in the piston of the cylinder causing the piston to move slowly in the cylinder following the movements of the worm gear.

If a sudden gust hits the Fresnel lens rotating system and the link to the piston pulled by the worm gear, the piston with its small orifice will slow down the movement of the worm gear through the link since the fluid must pass through the small orifice and acts as a brake slowing the movement of the piston and thereby the worm gear without affecting either the worm gear or the electric motor.

Absorber means of this type can be provided for several Fresnel lens rotating units connected in series or parallel. Preferably such a shock absorber will be attached on the rotating support above the counterweight and under the stationary tube assembly.

In a further embodiment of the present invention the absorber cylinder can be provided, on one side, with special valve which will open at a selected pressure and allow the fluid on the one side of the cylinder to drop into a nearby cylindric container.

The piston activated by the fluid on the opposite of the cylinder, and not emptied, exerts pressure on the Fresnel lens system together with the mirrors and counterweight and allows the rotating system to be moved to the initial morning position or last evening position reversed to the initial morning one; this will avoid deterioration by wind gusts.

The electric motor can be automatically stopped after the return of the system to the initial position; the fluid can be pumped either automatically or manually, once normal wind conditions prevail, into the side of the cylinder emptied after a wind gust has opened a pressure valve on this cylinder side.

Other means can be provided for facing high winds and/or wind gusts which may prevail especially in desert areas; such other means may comprise springs on each side of the supporting means. These can be combined with a rotating disk moved by the worm gear which can be detented to allow only notch by notch engagement avoiding speedy turning of the rotating disk.

Another embodiment of the present invention comprises providing, as a concentrator of solar energy, glass Fresnel lenses having grooves of different types on the same lens body. Large Fresnel lenses of about 84 cm aperture and 240 cm long have very good solar ray transmission of about 80–90% in the center part of about 50 cm and lower decreasing transmission towards the ends of about 65–70%. In addition, because prismal grooves are not sharp, some solar rays are scattered and do not reach the focus track, lowering the efficiency of solar energy concentration.

In accordance with this aspect of the present invention only the central part of about 50–60 cm are used and, on the same glass plate, side portions with properly angled grooves are provided in order to direct the solar rays to the same focus track as the central grooves. If the side parts of the lens are for instance 40–50 cm and have more grooves than the central part, duly oriented, this will provide a lens of 150 cm aperture for instance and only one focus target of 3 cm large, for instance. In such a case, the concentration ratio will be on the order of 50 times. This arrangement is of special interest for production of electricity with photovoltaic cells. Indeed, the electrical production will increase, with the concentration ratio increasing 50 times. The Fresnel lens with the mirror under the one tube assembly and the counterweight will turn to track the East-West daily location of the sun around the axis of the inside collector tube. Several Fresnel units can be arranged in parallel and in series.

When arranged in parallel, several Fresnel lens units may be arranged to have the same focus track thereby increasing the concentration ratio accordingly about 70 times or more. The mirror will have a large aperture equal to one of the large Fresnel lenses of the parallel array. The large mirrors of similar aperture of the large Fresnel lens or lenses will receive the scattered or direct solar rays and reflect them into the tube assembly increasing the solar collection efficiency and the concentration.

The collector assembly of tubes is as shown in previous disclosures with one metallic blackened conduit in which a fluid heated by solar energy concentrated by a lens system with the focus track on or under the metallic tube or glass tube enclosed in a second transparent glass tube spaced from the metallic or inside conduit by about 2 mm with air circulating in between. The glass tube is inserted into the third transparent tube. A second fluid circulates between second and third transparent tube. The fluid in the metallic or inside conduit heats the outside fluid in addition to the heat which the outside tube absorbs from the solar rays. The system thus provides a set of heat barriers limiting the heat losses especially for high heating temperatures of the inside fluid. However, the transmission of heat to the inside metallic conduit is reduced by the reflection of the glass tubes and by absorption of infrared rays by the outside fluid and the two glass conduits.

An airspace must always be provided between the innermost tube in which a fluid is heated to high temperature and the intermediate glass tube surrounding it, and inside an outer tube, with a second fluid between the intermediate and outside tube.

An alternate solution utilizes a rectangular, instead of round, inside metallic conduit. Another alternate solution is to provide at least two adjacent blackened metallic conduits inside the outer conduit. Another solution is to provide, in the inside conduit, an array of photovoltaic cells, all having two controlled circulating fluids as above. An aluminized reflective mirror will be provided below the conduit assembly. A counterweight will be provided below such mirror and the conduit assembly. The Fresnel or fluid lenses are rotated with the mirror, counterweight and supports around the axis of the inside conduit as indicated above. A security panel with an aluminized surface on the side of the collector is provided. The panel is adapted to drop on the collector in case of overpressure or of a temperature higher than selected. In certain cases the mirror below the tube assembly will be omitted and instead the outside tube will be partially enclosed in an insulated unit filled with insulating material with the upper part opened to allow the solar rays to rach the focus track. The insulation partially surrounding the outside tube is preferably stationary with the tube assembly whereas the mirror and lens system rotate to track the sun. Selection of the above alternate solutions will depend on the application of the solar energy to the metallic conduits. The barrier for heat losses which is reduced compared with the two glass inserted tubes is compensated by a flow of the second fluid at a controllable higher speed, between the two conduits. The heat losses by convection and radiation are proportional to the exposed surface of the outside radiation tube so it is of interest to reduce such surface, selecting a small diameter for the outside tube, for example 45 mm OD and by covering the lower part of such tube with insulation. The radiation losses are proportional with the temperature, that is $$\frac{(T)^4}{(1000)}$$

The temperature of the glass of the outside tube will depend on that temperature of the fluid circulating inside such tube which should be kept preferably at a maximum of 70° C. at its outlet.

BRIEF DESCRIPTION OF THE DRAWINGS

FIG. 1a is a perspective view of the double plate system of FIG. 1.

FIG. 2a is a plan view of an installation comprising a plurality of units such as that of FIG. 1.

FIG. 2b is an elevation view of the unit according to FIG. 1.

FIG. 3 is a perspective view of the unit according to FIG. 1, showing the installation of photovoltaic cells.

FIG. 11 shows two Fresnel lenses installed in the same frame and rotating together with the mirrors.

FIG. 12 shows the adjacent Fresnel lenses rotating together with a reflective mirror and the counterweight moved by a stationary worm gear activated by an electric motor to track the location of the sun with a stationary tube assembly.

FIG. 15a is an embodiment similar to FIG. 17 with a rectangular blackened metallic conduit.

FIG. 15b is an embodiment similar to FIG. 17 with two adjacent blackened metallic tubes.

FIG. 15c is an embodiment similar to FIG. 17 but with a transparent inside glass tube instead of a metallic tube with an array of photovoltaic cells installed in the inside tube and encapsulated in glass or plastic with fluids circulating in the inside and outside tube.

FIG. 15d is an embodiment similar to FIG. 17 but without a mirror below the tube assembly, and instead insulation around the outside of the tube except for an upper part allowing the transmission of the solar rays.

DETAILED DESCRIPTION OF THE INVENTION

Figure 1:
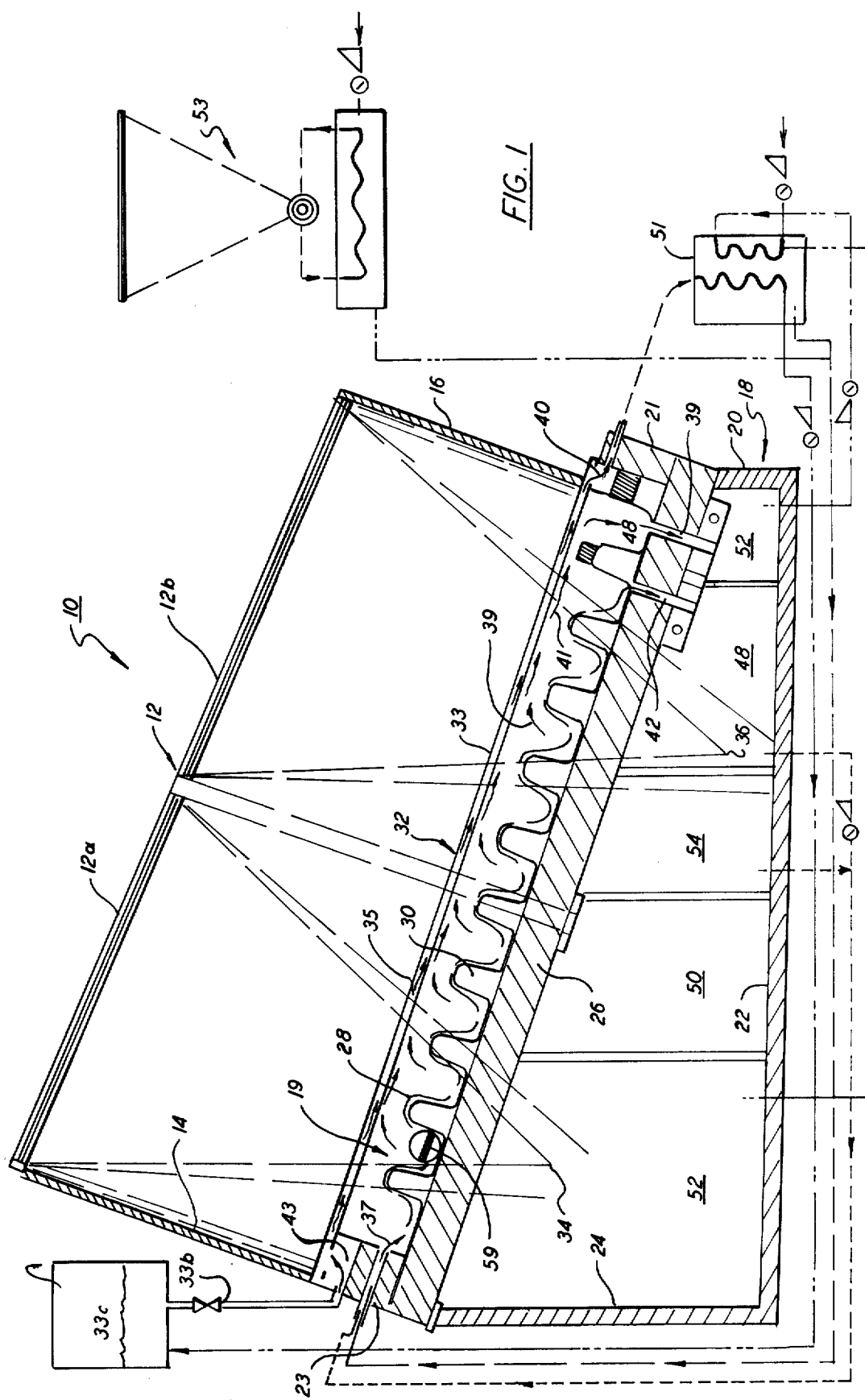
FIG. 1 is a cross-sectional elevation view through the first embodiment of distillation apparatus according to the present invention.

FIG. 1 is a cross-sectional view of solar distillation apparatus according to the present invention. The distillation apparatus 10 of FIG. 1 includes a Fresnel lens system 12 supported on a base structure 18, having a front wall 20, a bottom wall 22 and a rear wall 24. On the base structure is a container 19 including an insulating base plate 26 which rests on walls 20 and 24, a bottom end wall 21 and a top end wall 23. The Fresnel lens are supported by supports 14 and 16 which are attached to end walls 21 and 23 respectively. The container will, of course, have appropriate side walls, not shown in the figure. On top of this insulating base plate 26 is an undulated plate system 28 which can be made up as a single system or made up as a plurality of plates. The height of each of the undulations 30 should be, for example, 90mm (about 3.5 inches). The distance between undulations should be, for example, 120mm (about 5 inches). The Fresnel lens system 12 is tilted to an angle A of, for example 30° and base plate 26 with the plate system 28 thereon tilted, in the illustrated embodiment, to an angle of 20°. In general, this angle A will be selected as described in my aforementioned applications Ser. No. 915,001. Interposed between the Fresnel lens 12 and the plate system 28 and parallel to base plate 26 is a double plate conduit 32. In this double plate conduit, having a lower plate 31 and upper plate 33, a fluid 35 circulates in the manner described in my aforementioned Ser. No. 915,001. Salt water 37 which is to be evaporated is supplied to upper end of the plate system 28 through end wall 23 and flows downward over the undulations 30. In the process, heat from the sun which is concentrated by the Fresnel lens system, which in the illustrated embodiment includes a Fresnel lens 12a and a Fresnel lens 12b, evaporates some of the water in salt water flowing over the undulations 30. In accordance with the present invention in order to spread the solar energy over a larger area, the focal points of the Fresnel lenses 12a and 12b designated as points 34 and 36, respectively, are located below the insulating base 26. Typically, for example, if the focal distance of the lens is 105mm [42 inches], i.e., where there is a distance of 42 inches from the lens to the maximum area of concentration, the plates will preferably be located at, for example, 90cm [35.5 inches] from the lens. The evaporated water vapor 39 which will typically be about 75° C. rises and is condensed on the bottom plate 31 of conduit 32 which contains a fluid 35 typically at 30° C. The condensate 41 runs down the inside of the plate and is collected in a compartment 38 from which it flows through an opening 39 to a compartment 52. The fluid 35 flowing between the plates 31 and 33 of the conduit 32 is collected in a compartment 40. Brine 43 which results from the evaporation of the water from the salt water flows through an outlet 42 of the plate system 28 through plate 26 to a compartment 48.

The plates of the plate system 28 are preferably made out of metal such as steel, stainless steel or copper, having a thickness of, for example, 1mm. It is preferred that they be covered by a black paint or chrome black. The paint or other agent used should be of an anti-corrosive material and provision should be made, if necessary, to provide cathodic protection for the metal structure to prevent the damage which could result from electrical currents caused by the reaction between the metal surfaces and existing chemicals in an electrolytic solution in the water.

As an alternative to metal, undulated asbestos fiber, glass or plastic plates can be used. Metallic undulated plates are preferred since they will conduct heat to all sides of the plates, from the location of the striking solar rays in the focal area.

As the water being distilled flows over the undulations, it will be in cavities which are only about 90mm deep. The thinness of the water in the cavities between the undulations 30, coupled with the thin layer of water which flows over the undulations 30 will result in fast heating and evaporation of the water.

Since deposits can form on the plate system 28, a single panel or plurality of adjacent panels made of blackened flexible plastic or the like such as isobutyl can be used to cover the wall or the bottom plate system and be attached thereto in a removable manner so that the plastic covering can be taken out and the deposits thereon removed. The double plates 31 and 33 are partially obstructed at the extreme ends (see FIG. 1a) by silicone or other means leaving a small outlet 33a for the release of the fluid to compartment 40. This is done so to allow the fluid 35 to spread all over the surface between the plates 31 and 33. A valve 33b at the upper end of the double plate system 32 permits selectively controlling the flow of the fluid 35. The fluid 35 will flow to a collector 43 at the inlet to the double plates 32 from a tank 33c at a height of, for instance 40cm (about 17") above the collector 43 so as to allow a maximum pressure between the plates 31 and 33.

As illustrated by FIGS. 2a and 2b, a plurality of units such as that shown in FIG. 1 can be provided operating in series and/or in parallel. Furthermore, the Fresnel lenses can be arranged so as to run both east-west and north-south. In the embodiment of FIG. 1, the linear Fresnel lenses run in a north-south direction. The double glass plates 32 are shown in FIG. 2a and 2b as 32a, 32b, 32c, 32d, 32e, 32f. They are tilted east-west, whereas the Fresnel lenses are oriented north-south.

In accordance with another feature of the embodiment of FIG. 1, storage areas are located beneath the insulating plate 26. Shown is a storage area 48 for brine 42, a storage area 50 for the fluid 35 circulated in the double plate conduit 32, a storage area 52 for the condensate 41 and a storage area 54 for concentrated brine. By storing the various fluids beneath the insulating base, further insulation and retention of heat within the system is obtained. Circulation of the various fluids can be carried out in the manner described in my aforementioned application Ser. No. 915,001, and furthermore, as described above. Basically, the fluid collected in the compartment 40 which normally starts out at 30° C. and is then heated up to approximately 65° C. by the vapor at 75° C. is circulated to a heat exchanger 51 where it transfers heat to the incoming salt water and in the process is cooled back down to 30° C. It is then recirculated to a container 33c and flows through value 33b entering the double plate system through end wall 23. Condensate from compartment 52 can also be circulated through heat exchanger 51. In addition, recirculation of the brine for concentration thereof and removal of additional heat therefrom in the manner described above may be carried out as shown. Salt water from heat exchanger 51 along with additional preheated saltwater from another solar system 53, such as that of my previous application or as described below, enters plate system 28 through opening in end wall 23.

FIG. 3 is a perspective view of a system such as that shown in the FIGS. 1 and 2. Once again, the insulating base 26 is shown as is the plate system 28 with its undulations 30. The two Fresnel lenses 12a and 12b are shown as is the double plate conduit 32. However, in this embodiment, at the bottom of the plate system above the points 34 and 36 where the solar energy is concentrated (see FIG. 1), there are installed arrays of photovoltaic cells 59. Photovoltaic cells 59 produce electricity from the visible solar rays only, i.e., those form 0.4 to 0.8 microns. The infrared rays will be mostly absorbed by the fluid flowing in the double plate system 32 and by the water being distilled which circulates above and around the photovoltaic cells. By using such an arrangement a separate photovoltaic cell installation in order to produce electricity is not necessary. Furthermore, because of the concentration of the solar energy by the lenses, a production of electricity up to, for instance, twenty times that can only be produced with concentration. For example, the average yearly production of electricity may be increased to about three watts per cell with the concentration as compared with about 0.061 Watt per cell without concentration.

This arrangement offers many advantages since it allows concentrating the energy on the cell and, at the same time, removing infrared energy, which would otherwise heat up the cell and reduce its efficiency. The infrared energy is absorbed by the water 37 being distilled and by the fluid 35 in the dual plate conduit 32 and the distilled water around the cells circulating in the tube enclosing the cells are shown herein, whereas the visible light is utilized to generate electricity. Thus, simply for the additional cost of the cells themselves, a system which is both a distilling and an electrical generating unit is provided. Without such cooling, the temperature would be higher reducing the efficiency of the silicon voltaic cells and if the temperature exceeded 200° C., the efficiency would drop to 0 and the cells could melt.

Figure 3A:
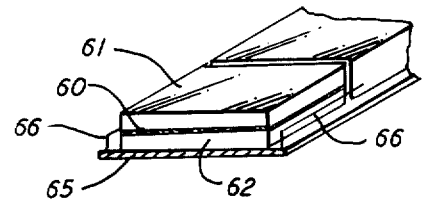
FIGS. 3a and 3b illustrates two solar cell arrangements useful in the embodiments of FIGS. 1-3.
Figure 3B:
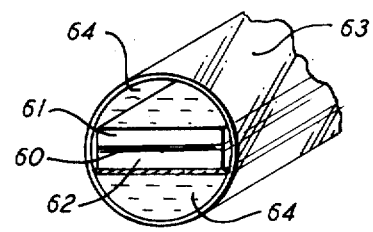

The array of photovoltaic cells can be installed in a transparent square encapsulate protecting the cells from the saline water and over and above which saline water is circulated. FIG. 3a shows a photovoltaic cell 60 with a sub base 62, and an encapsulation 61, board 65 and interconnet line 66. The photovoltaic cells can also be installed in a transparent glass tube in which a fluid such as distilled water is circulated to cool the cells. FIG. 3b shows a design with photovoltaic cells 60, sub base 62 and surrounding transparent tube 63 and cooling fluid 64. This fluid 64 will preferably be the condensate of the distilling unit, i.e., the condensate which is collected in compartment 38 after it has given up its heat in a heat exchanger for preheating the water being distilled. In this manner, the temperature of the condensate can be reduced from about 75° to about 30° C. This offers a number of advantages in that it prevents heated salt water from flowing around the photovoltaic cells and with the attendant deposits and corrosion which could occur. In addition, by having the temperature at 30° instead of 75° C., more efficient production is obtained. For example, with every 1° C. increase in temperature there is approximately 0.4% decrease in electricity production for temperature above 30° C. Thus, by encapsulating the cells and cooling them with condensate the efficiency is increased and the deposit of salts and corrosion of the cells is prevented.

Figure 4:
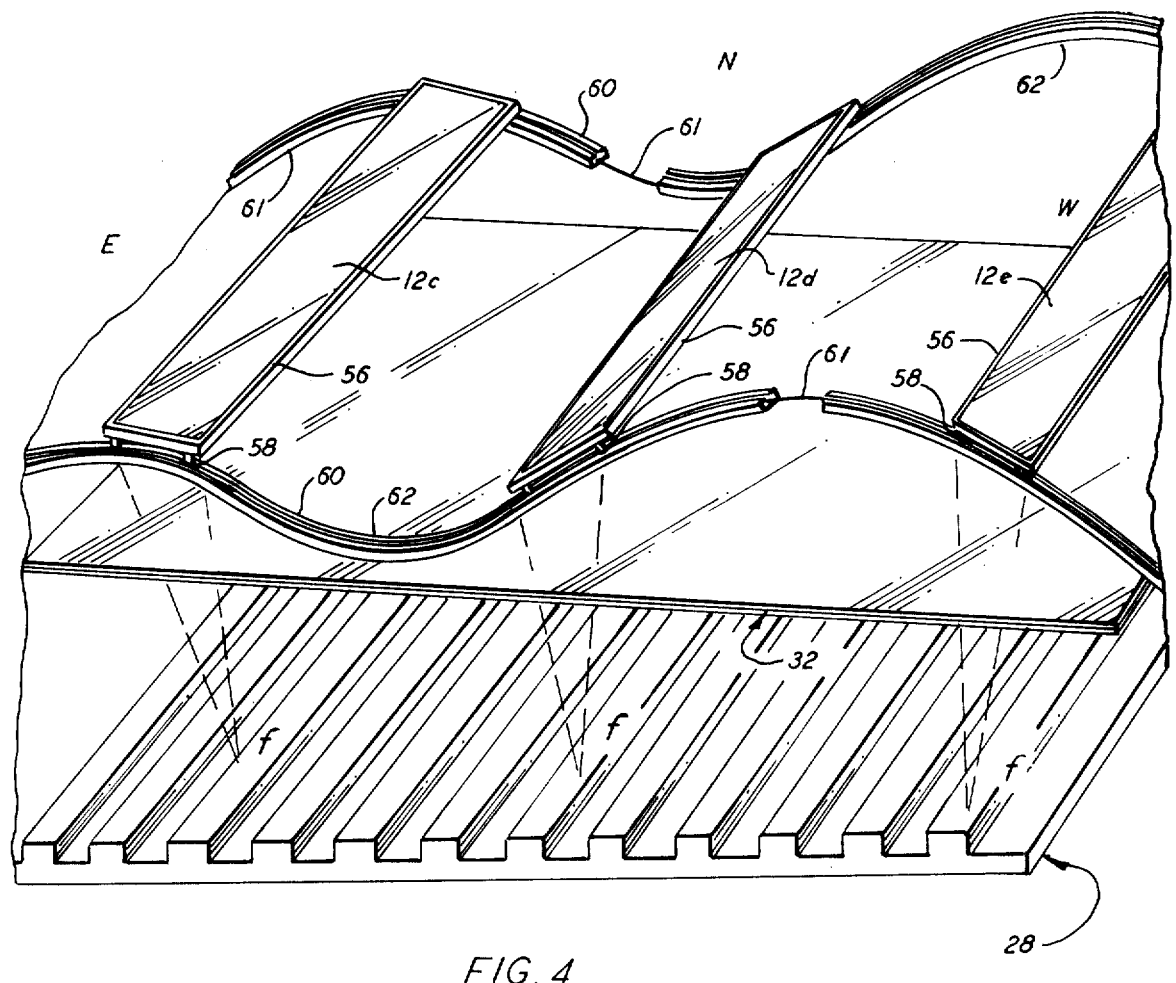
FIG. 4 is a perspective view of an improved system for moving lenses to track the sun.

FIG. 4 illustrates another embodiment of the present invention. In this embodiment, once again the undulated plate system 28 is visible as is the dual plate conduit 32. In this arrangement, the Fresnel lenses, of which three positions 12c, 12d and 12e are shown, is somewhat different. The Fresnel lenses are contained in frames 56 preferably of a metal such as anodized aluminum. Mounted at each corner of each frame 56 is a rolling means 58, e.g. a wheel, ballbearing track or the like, which rides in a respective track 60. The tracks have a sinusoidal shape which is determined by the specific latitude location at which the unit is to be used. The tracks 60 run in a east-west direction. The frames are preferably connected together by a cable system 61 pulling in both directions and the cable to be driven by a motor activated by a cnetral sensor system. In this way, all of the frames 56 with their Fresnel lenses will move together. The system is driven such that from sunrise to sunset the rays of the sun will always be essentially perpendicular to the Fresnel lens. At the end of the day, after the sun sets, the lenses can be driven back to their morning starting position in response to an appropriate command.

The track system offers a number of advantages. The weight which must be moved is much less than that which must be moved in rotating a lens and supporting structure, in systems such as those disclosed in my aforementioned Ser. No. 920,288. However, such systems can also be used for rotating the Fresnel lenses used in the present invention. Such is, for example, illustrated diagrammatically by the arrows 62 of FIG. 3.

Tracking is preferably done only for the elevation about the north-south axis. Deviations for seasonal locations of the sun which is a maximun angle of 23.5° from equinox to solstice will be on each side of the central axis of the focal line without the elevation tracking. The seasonal changes will be along the axis of the focal line with elevation tracking provided. In the case of FIG. 3, the lenses will be rotated about the focal point. Again, this can be done in accordance with my aforementioned Ser. No. 920,288.

Figures 5, 5A:
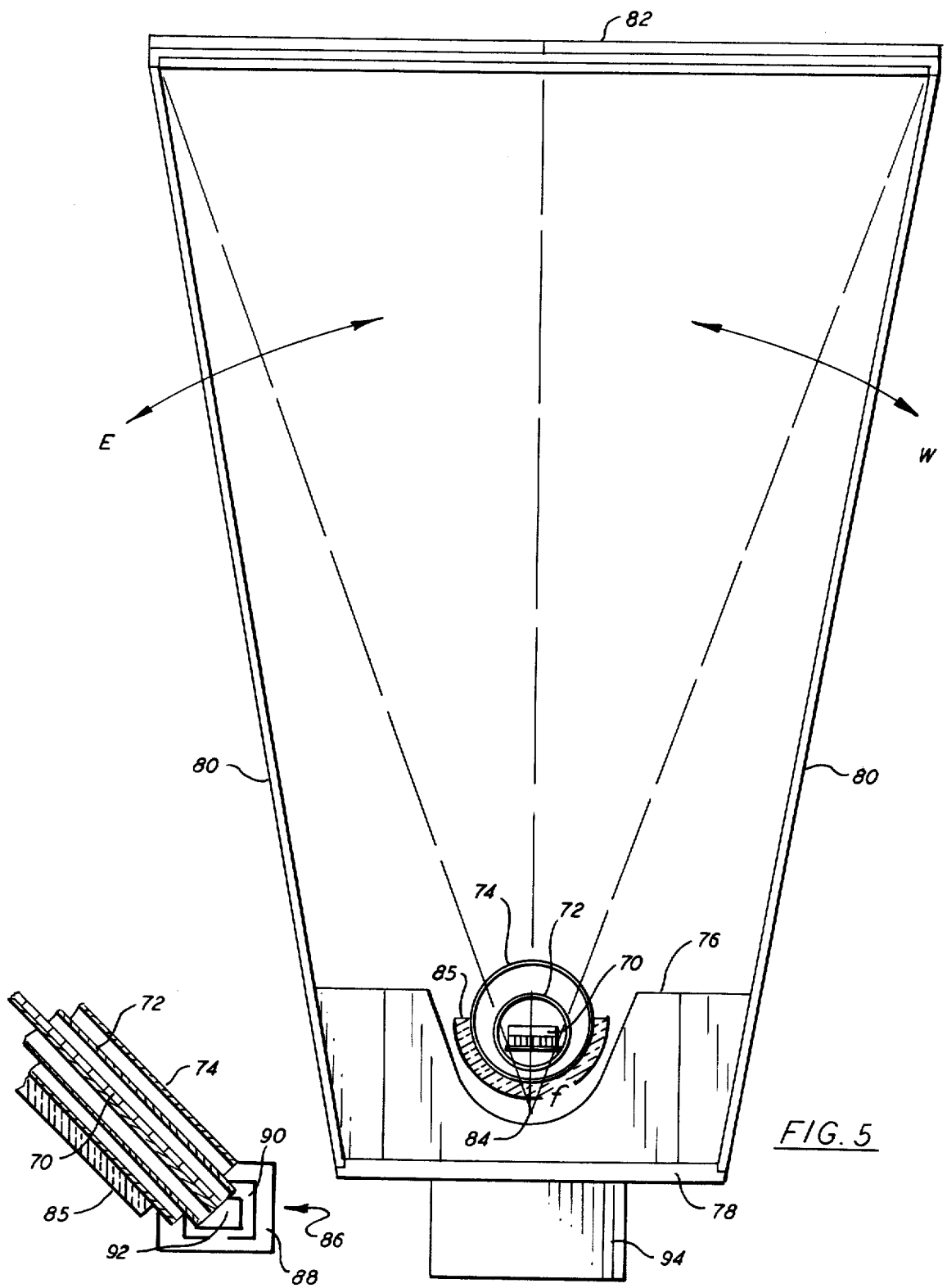
FIG. 5 is a cross-sectional view in front elevation, of embodiment using concentric tubes.
FIG. 5a is a side elevation view in cross-section, of the embodiment of FIG. 5.

FIG. 5 illustrates another embodiment of the present invention. Photovoltaic cells 70 are installed inside a transparent glass or plastic tube 72 which is inserted in another transparent glass or plastic tube 74. Salt water or brine flows over and around the array of photovoltaic cells 70. The vapor evaporated from the circulating distilling water or brine 69 will condense on the inside wall of the inside tube 72, and the condensate will flow along such wall and will be collected in the compartment 90 (FIG. 5a). The tubes 72 and 74 are supported above a support 76 containing a cutout of somewhat semi-circular shape much in the manner of the similar arrangement disclosed in the aforementioned Ser. No. 920,288. Member 76 rests on a base 78 from which extend side supports 80. The supports 80 support a Fresnel or fluid lens 82. The space between the tubes 72 and 74 contains a fluid similar to the fluid contained in the double plate conduit of the previous embodiments. In a similar fashion, this fluid acts to aid in condensing the vapor which is evaporated from the salt water and brine. Furthermore, along the salt water in the inner tube, it acts to absorb the infrared radiation to maintain the photovoltaic cells 70 cooled. As in the previous embodiments, the focal point 84 of the Fresnel lens 82 is located below the photovoltaic cells 70 so that the radiation is spread thereover.

FIG. 5a a cross-sectional elevation view of the tube system utilized in FIG. 5. The system is preferably tilted at an angle depending upon the latitude of location. Also shown in this view is a collector arrangement 86. The collector arrangement is divided into three compartments. An outer compartment 88 receives the fluid which is flowing between the tubes 72 and 74 for recirculation in the manner described above. The condensate is directed into a middle chamber 90, and brine directed into an inner chamber 92. The fluid in the space between the tubes absorbs the infrared radiation as does the salt water being evaporated. But visible radiation is used to generate the electricity, since it is this radiation in the range of 0.4 to 0.8 microns which produces electricity. The fluid between the glass tubes 72 and 74 as shown in FIG. 3b absorb the infrared solar rays and heats the circulating fluid which heat is recovered in the same manner described above.

The tube assembly is stationary with the remainder of the structure supported for rotation about the axis of the inner tube. Again, this can be done in the manner described in my aforementioned Ser. No. 920,288. To reduce the forces required for rotation, a counterweight 94 is provided and attached to the base 78 of the structure. The moments are selected so that the weight of the counterweight 94 times its distance from the axis or rotation is approximately equal to the weight of the Fresnel lens and its supporting structure times its distance from the axis of rotation. As indicated above the counterweight 94 can be either a steel bar or a container filled with a heavy low cost material such as sand or concrete.

A plurality of units of this nature can be mounted in parallel and rotated by central sensing means and a common electrical motor as previously described. This arrangement, as did the previously described arrangements, permits the distillation of water to be combined with the production of electricity of photovoltaic cells without the need of the plate system described above, but simply through the use of a tube system.

Figure 6:
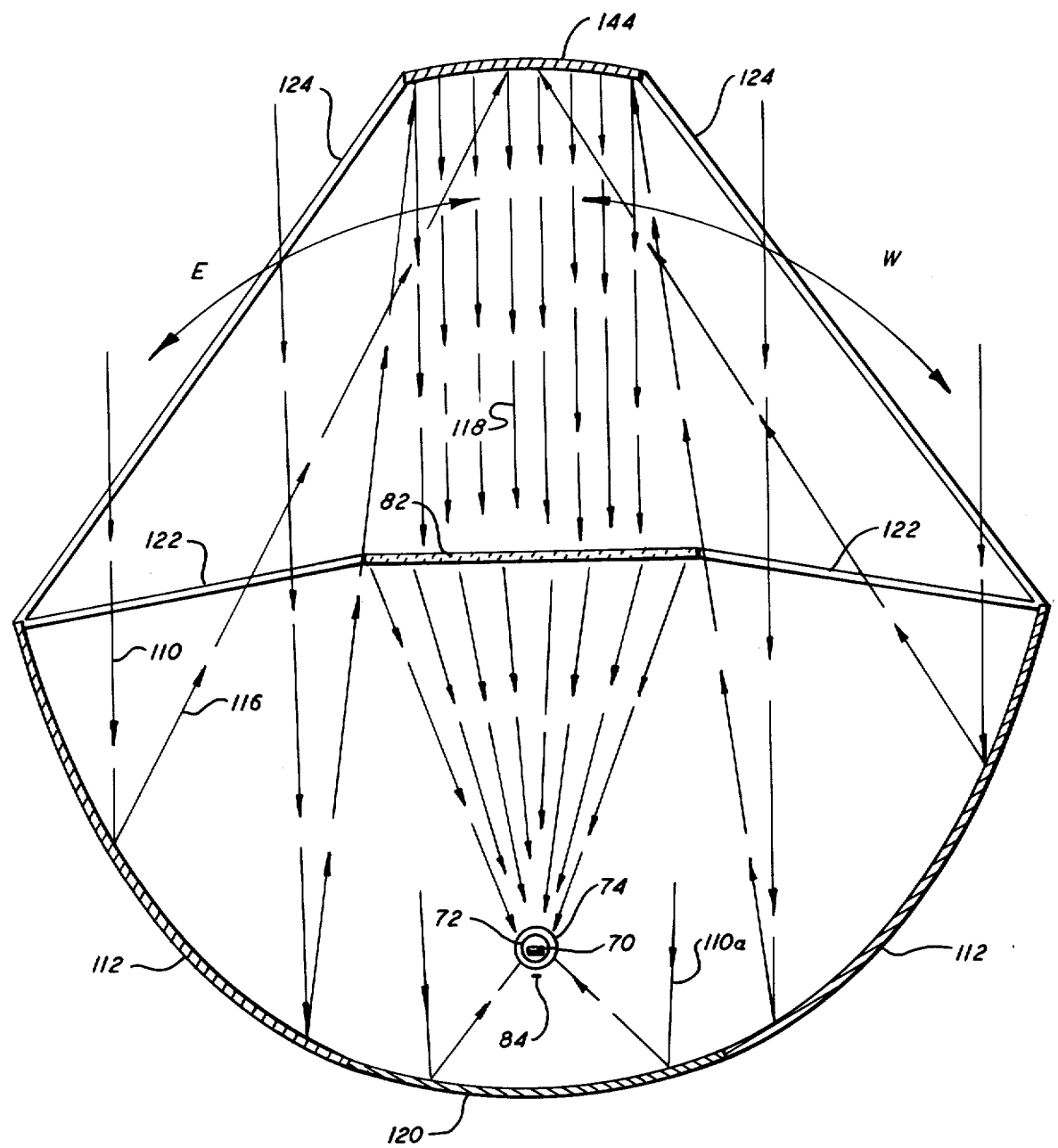
FIG. 6 is cross-sectional view of a further embodiment of the present invention in which mirrors surrounding a conduit system are utilized for the concentration of energy.

A further embodiment of the present invention is illustrated in FIG. 6. In the embodiment therein, a tube system having an outer tube 74, inner tube 72 and possibly a photovoltaic cell array 70, much in the manner of that shown in FIG. 5 is used. Once again, disposed above the tube system is a Fresnel lens 82. And again, it is arranged so that its focal area is below the tube system in order to spread the radiation over a larger area. However, in this embodiment a plurality of mirrors are used to further concentrate the energy. With this embodiment, incoming solar rays 110 are reflected from curved mirrors 112 which are to the side of and, below the Fresnel lens 82. Installed directly above the Fresnel lens is a mirror 114. The mirror 114 is shaped so as to collimate light. The collimated light 118 then impinges on the Fresnel lens 82 which focuses it in the manner described above.

Directly below the tube system is a further mirror 120 or the same extended mirror 112 which directs additional incoming solar energy 110a onto the bottom portion of the tube 74 to collect further amounts of energy. The mirrors 112 and 120 will, of course, be supported in conventional fashion. Supports 112 of the Fresnel lens and supports 124 for the mirror 114 are also shown.

The system of FIG. 6 is supported to track the movement of the sun. As with previously described systems, the axis of rotation is the central axis of the inner tube 72. The tube system itself will remain fixed so rotation can be carried out in the manner described above and in the aforementioned Ser. No. 920,288.

The system of FIG. 6 can substantially increase the received radiation since the surface of the mirrors 112 is larger than the Fresnel lens 82. The concentration of solar energy at the focus area 84 will be much higher when one considers the larger proportion between the surface of the mirrors 112 and 120 and the surface of the focus 84. Thus, this embodiment is particularly applicable to the production of electricity which increases almost proportionately with concentration. As in the previous embodiments, the infrared rays will be absorbed by fluids both between the tubes 72 and 74 and the fluid within the tube 72.

As with any of the aforedescribed embodiments, a fluid lens may be provided instead of a Fresnel lens. In this embodiment in particular, when used for electricity production from photovoltaic cells, a fluid lens may be beneficial since it will increase the absorption of infrared radiation, i.e., the fluid in the lenses will act as further absorber for infrared radiation.

Figure 7:
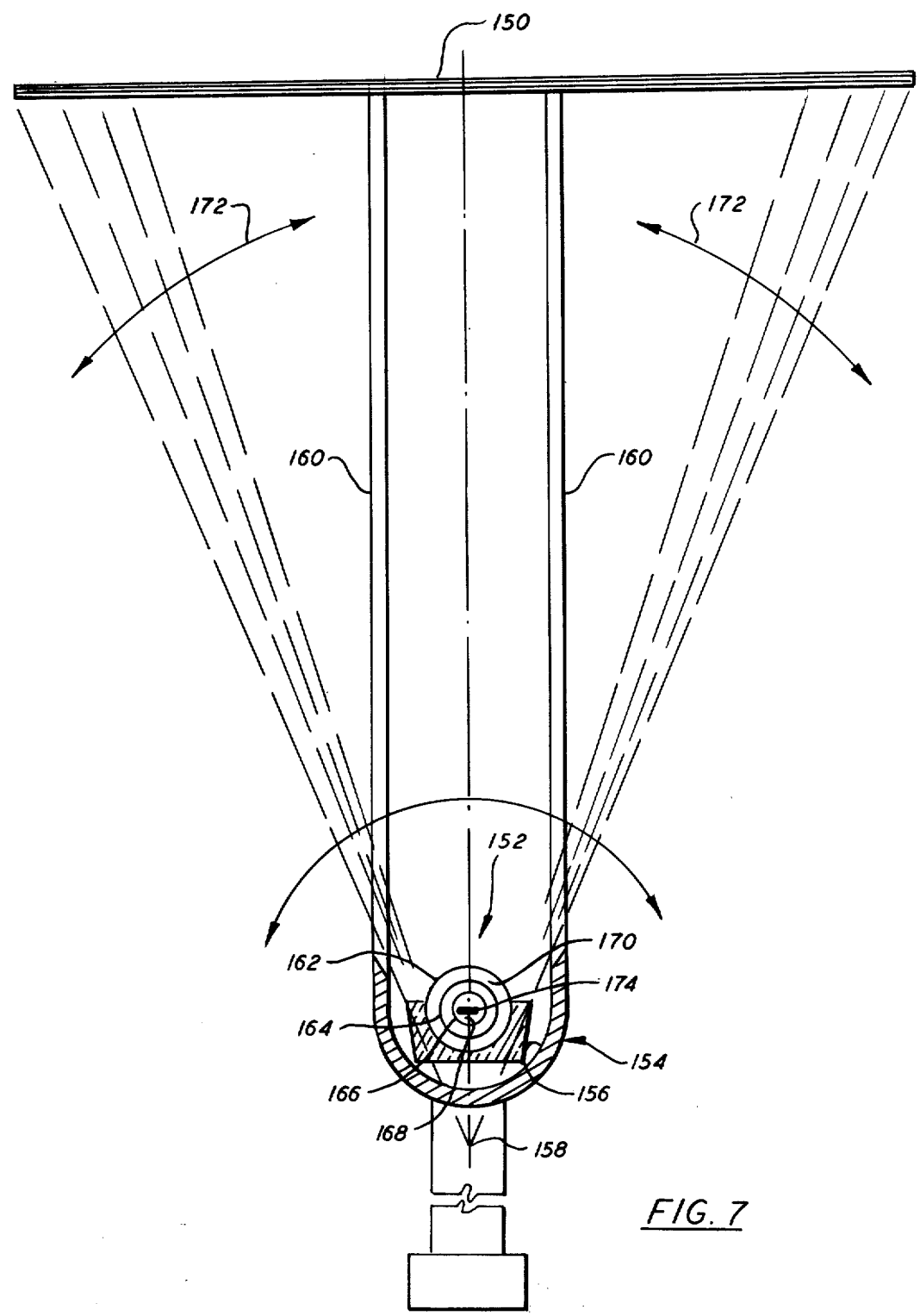
FIG. 7 illustrates a further embodiment of the present invention utilizing a tube assembly and Fresnel lens of large aperture and a movable longitudinal mirror under the fixed tube assembly.

A further embodiment of the present invention is illustrated in FIG. 7. This embodiment is in many ways similar to the embodiment of FIG. 5. However, in the embodiment of FIG. 7 a particularly large Fresnel lens 150, e.g., of an aperture up to 150mm is utilized to heat fluids in a tube assembly 152. Beneath the tube assembly is a semicylindrical or parabolic structure 154 having a mirrored surface 156. The mirror can be made of metal or glass or plastic and covered on its inside surface with aluminum sheeting, or aluminized, or back silvered glass, or made reflective by other means. The focal area of the Fresnel lens 150, designated as 158 is below the structure 154. The structure 154 is continued as, or attached to, supports 160 for the Fresnel lens. Because of the large size of the Fresnel lens 150, not all of the radiation focused thereby is directed on the tube assembly 152. Some of the radiation falls alongside the tube assembly 152. This radiation is then reflected by the mirrored surface 156 back onto the tube assembly 152. In addition, rays of the sun outside of the Fresnel lens will also strike the mirror 156 and be reflected. The tube structure 152 includes an outer tube 162, an intermediate tube 164 and an inner tube 166. A fluid 168 can flow in the inner tube with a fluid 170 flowing in between the outer and intermediate tubes 162 and 164. With this type of an arrangement, the fluid 168 can be heated up to a temperature of, for example 300° C. The fluid 170 will be circulated and maintained at a temperature of, for example 75° C., so as to limit the heat losses from the fluid 168 and also to absorb additional energy which is reflected within the tube assembly 152. The inner tube can be made out of metal preferably blackened by electroplating with a fluid circulating inside the metallic tube, the focus target will be on the surface of the metallic tube. The metallic tube will be surrounded at a selected distance of, for instance 2mm by a transparent glass tube. A fluid will be circulated between the two glass tubes at a selected rate. The metal heated by the concentrated solar energy will heat with a high emissivity of the order of over 90%, the fluid circulating inside the metallic tube. The air cushion will act as insulation, forming a heat barrier for the convection losses together with the two glass tubes, and especially through absorption of heat by the fluid circulating between the two glass tubes with control of the circulating rate. The radiant heat emitted by the metallic tube with less than 10% radiation will also mostly be absorbed by the above heat barriers. All of above will insure low heat losses and high efficiency of the system. As with my previously described embodiments, the structure comprising the member 154, supports 160, and Fresnel lens 150 will be supported for rotation as indicated by arrows 172. As in the previous embodiments, rotation will be about the axis of the inner tube of the tube assembly 152 and will be used for tracking the sun. In addition, the assembly can also be mounted to track seasonal changes, i.e., be mounted for movement both in azimuth and elevation. In addition to its use as a system for heating a fluid, the system can also be used for distillation and for the production of solar energy. Thus, the inner tube 166 may comprise the encapsulation for solar cells 174 in which a cooling fluid such as distilled water is circulating in the manner described above. The space between the inner tube and intermediate tube 164 can contain water to be evaporated, and the space between the outer tube 162 and the intermediate tube 164, a cooling fluid for condensing the evaporated water, much in the manner disclosed in connection with FIG. 5. Of course, this embodiment can be used for the production of electrical energy with photovoltaic cells alone, or may be used for distillation alone as can the embodiment of FIG. 5.

Figure 8:
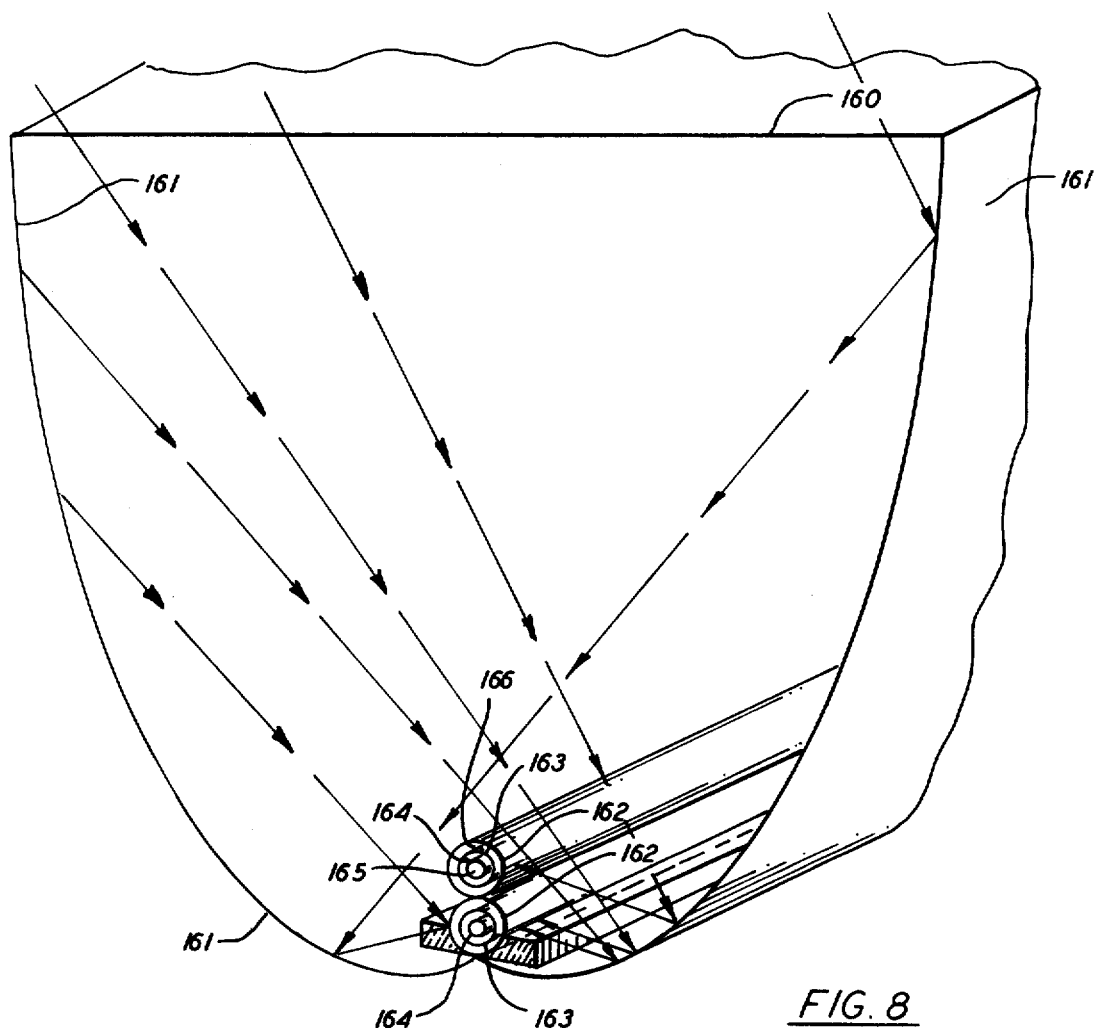
FIG. 8 is a perspective view of an embodiment of the present invention in which parabolic mirrors are utilized to focus solar energy on one or more tube assemblies.

FIG. 8 shows another embodiment of the invention. It provides reflective parabolic longitudinal mirrors 161 of adequate shape, preferably made of thin waterwhite glass or similar reflective material. Solar rays will be reflected on one or more tube assemblies 162, 163 and 164, inserted in each other. Fluid 165 will circulate in the inside tube. Also a fluid 166 will circulate between the outside tube and the intermediate tube inserted in it. Photovoltaic cells and or distillation of water can be provided as shown in FIGS. 5, 8 and 9 above.

The design as shown in FIG. 8 does not require a concentrating lens. The tube assembly will be oriented East-West and no tracking may be required since the solar rays from East and West will be reflected on the tube assembly.

Figure 9:
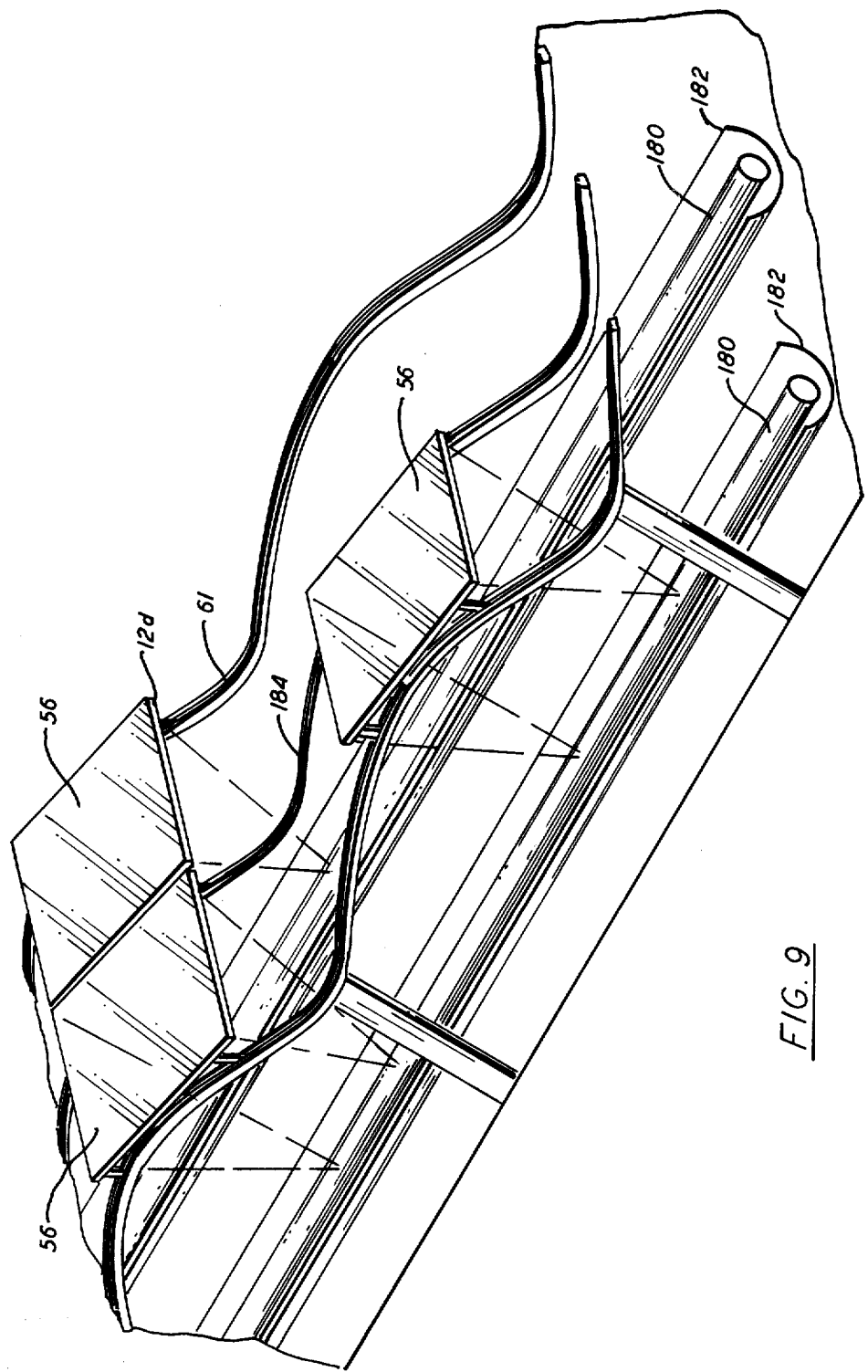
FIG. 9 shows a sinusoidal railing for tracking lenses along their longitudinal dimension, side by side in series and parallel with a stationary collector tube assembly and reflective mirror and also shows providing adjacent Fresnel lenses being moved together with one cable common to the frames of several lenses.

FIG. 9 shows a tracking system similar to the one shown on FIG. 4. The Fresnel lenses 56 with their frames 12d are pulled East-West along the sinusoidal stationary railing 61 to follow the location of the sun during the day. In the evening they are pulled back to the initial morning position. The Fresnel lenses are moved in the direction of their longitudinal side (244 cm) providing a continuous heating of the circulating fluids in the collector assembly 180. The collector tube assembly 180 together with the surrounding reflecting mirror 182 around its bottom surface are stationary. The focal line will be on or under the tube assembly. The inside tube of the tube assembly can be a blackened metallic tube. In case encapsulated photovoltaic cells are installed in the inside tube such tube will be of glass or plastic (see FIGS. 15-15c). The Fresnel lenses 56 can be adjacently installed in the same frame or combined frames with only a control cable 184 provided for moving them.

This arrangement permits selected stationary collectors of selected length to be utilized especially when metallic tubes with easy interconnection are considered.

Figure 10:
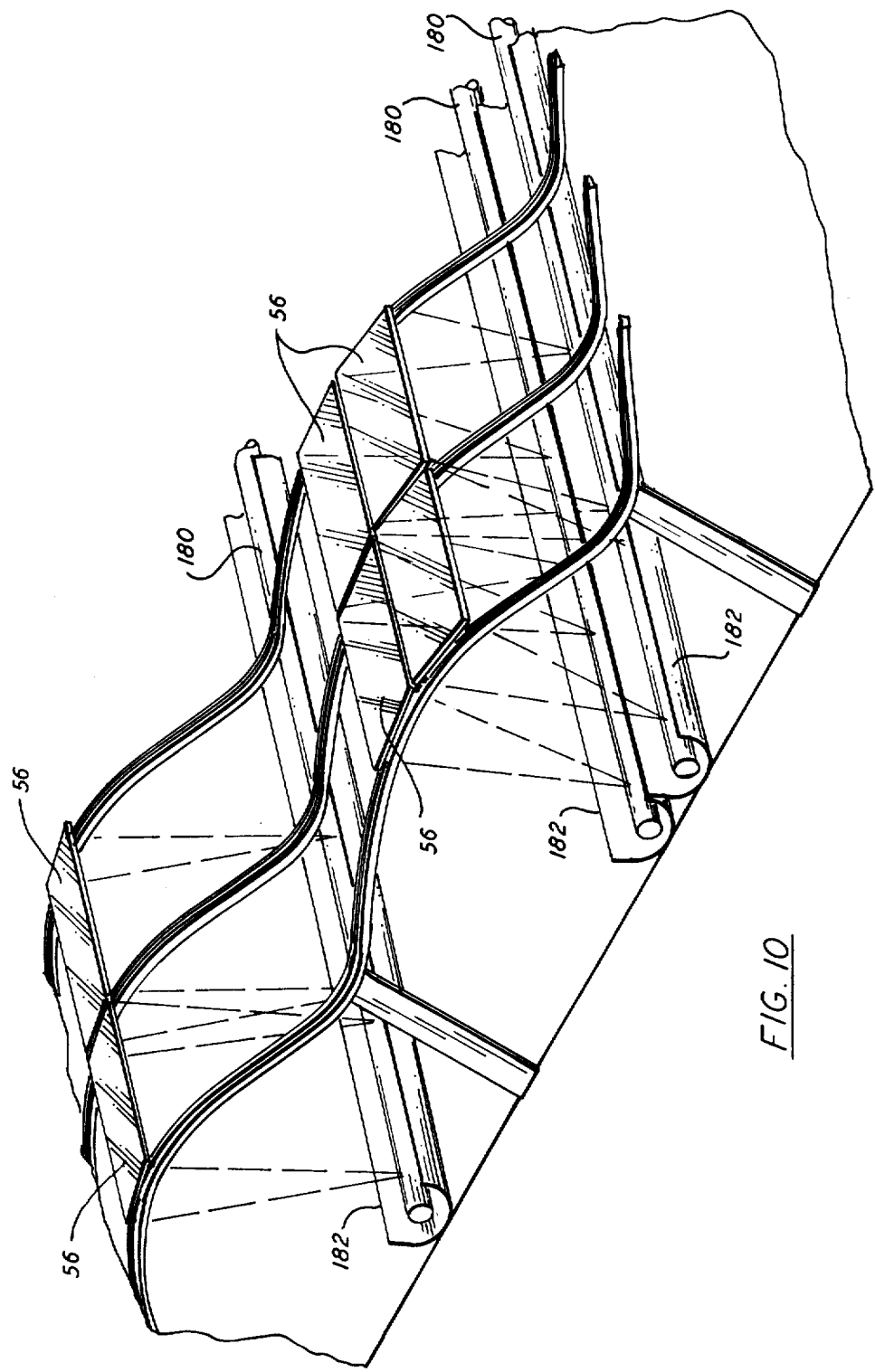
FIG. 10 shows a tracking system similar to that of FIG. 9 with a sinusoidal railing moving in the lateral direction of the Fresnel lens.

FIG. 10 provides a similar tracking system. However, the Fresnel lenses 56 are moved in the direction of their width (84 cm) instead of their length as in the previous case. Several Fresnel lenses can be installed in the same or adjacent frames and moved together on two or more railings. Parallel stationary tube assembly collectors 180 with surrounding reflective mirrors 182 around their bottoms are provided; photovoltaic cell arrays can be installed.

The Fresnel lenses can be provided only in parallel or in series and parallel or singly.

FIG. 11 illustrates an embodiment in which two Fresnel lenses 190 and 192 are supported in a common frame 194 adapted for rotation by means of a ring gear 196 driven by a worm gear 198. As in other embodiments a counterweight 199 is provided. An aluminized mirror 191 is provided below each of two tube assemblies 193 similar to the embodiment of FIG. 9. Also installed are protective flaps 195 adapted to be lowered if a predetermined temperature or pressure is exceeded in tube assemblies 193.

FIG. 12 shows an absorbing device for absorbing the shock of a wind gust, for example. A stationary worm gear 200 rotates a disk 202 which drives a Fresnel lens system 204 (see FIG. 11) with mirrors 191 and support 194 and a counterweight 199 for balance. The tube assemblies 193 remain stationary. The E-W movement of the supports 194 is linked by linkages 214 and 216 so as to cause a linear movement of piston 218 provided with at least one orifice 220 moving in a cylinder 222 filled with a fluid 224 in chambers 226 and 228 on opposite sides of piston 218. Fluid is pushed through the narrow orifice 220 from chamber 226 to the chamber 228 as the lenses rotate from East to West. In the case of a wind gust, the flow of the fluid from the one chamber to the other will be slowed by the passage through the narrow orifice 220. They will act as a brake and slow down any rotating movement of the Fresnel system. The fluid from the one chamber such as 226 may flow through a special pressure relief valve 230 into another cylinder 232. This will allow the Fresnel system to drop to the initial East position of the morning or to the extreme West position and then reverse to its initial morning position. The electric motor will be stopped after the Fresnel system is dropped to its initial morning position and thus the worm gear 200 will discontinue moving the Fresnel system.

After the wind gust is over and for normal continuation of operation, the fluid will be pumped by a piston 234 into the cylinder 222. This can be done either manually or automatically by acting on the piston 234.

A series of Fresnel lens units can be coupled together and to the shock absorber of FIG. 12 for absorption of the shock by high winds or gusts.

Figure 13:
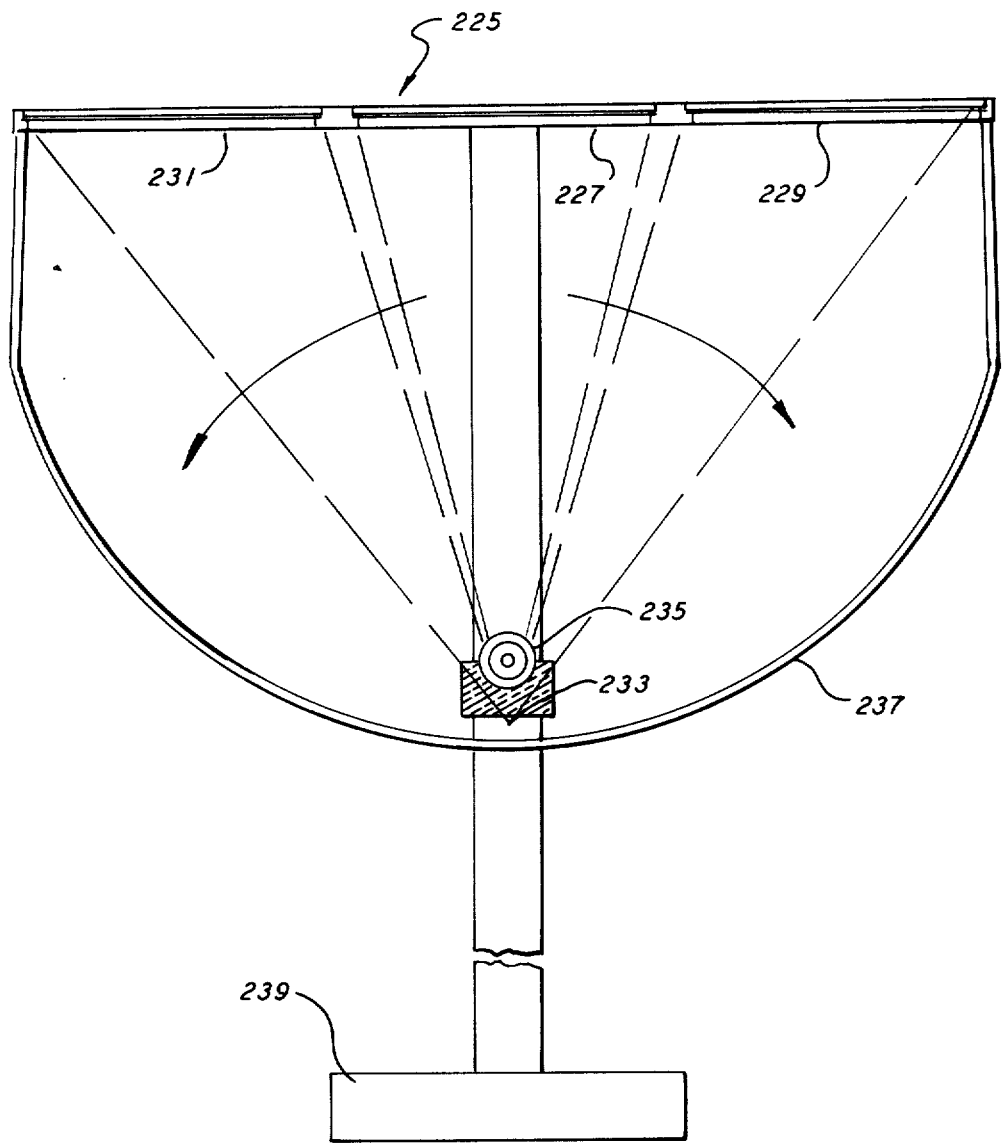
FIG. 13 shows a Fresnel lens with different grooves on the central and side parts in order to have the same focus track and high concentration ratio.

FIG. 13 shows a Fresnel lens 225 with three sections, a central section 227 and side sections 229 and 231 with different grooves allowing all solar rays for each of the positions to focus on the same focus line 233 preferably under a tube assembly 235. A reflective mirror 237 is installed beneath the tube assembly. Mirror 237 has a large aperture, similar to the one of the Fresnel lens.

A counterweight 239 is provided, with the entire system supported for rotation around the axis of the inside tube in stationary tube assembly 235.

Figure 14:
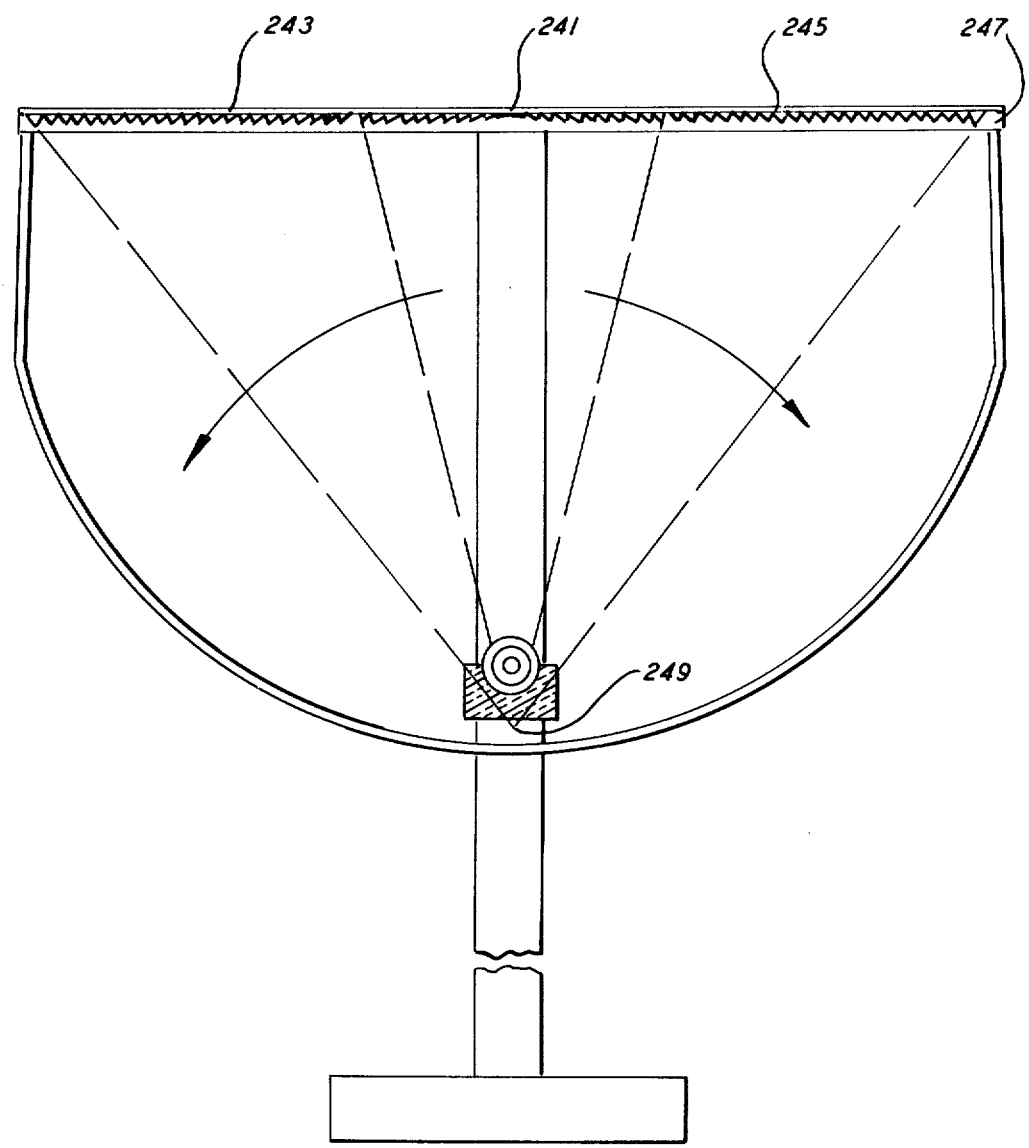
FIG. 14 shows an array of Fresnel lenses in parallel with further increase of the aperture in order to obtain high concentration.

FIG. 14 shows a system similar to that of FIG. 13. However, in this embodiment, three large Fresnel lenses 241, 243 and 245 are adjacently installed in parallel in the same frame 247. Lenses 241, 243 and 245 have proper grooves for focusing in the same focus track 249 with similar tracking as in FIG. 15. The systems described in the aforementioned application No. 807,513 showing separate lateral Fresnel lenses inclined to avoid the elevation and seasonal tracking of the system may also be applied to the lens systems of FIGS. 13 and 14.

Figure 15:
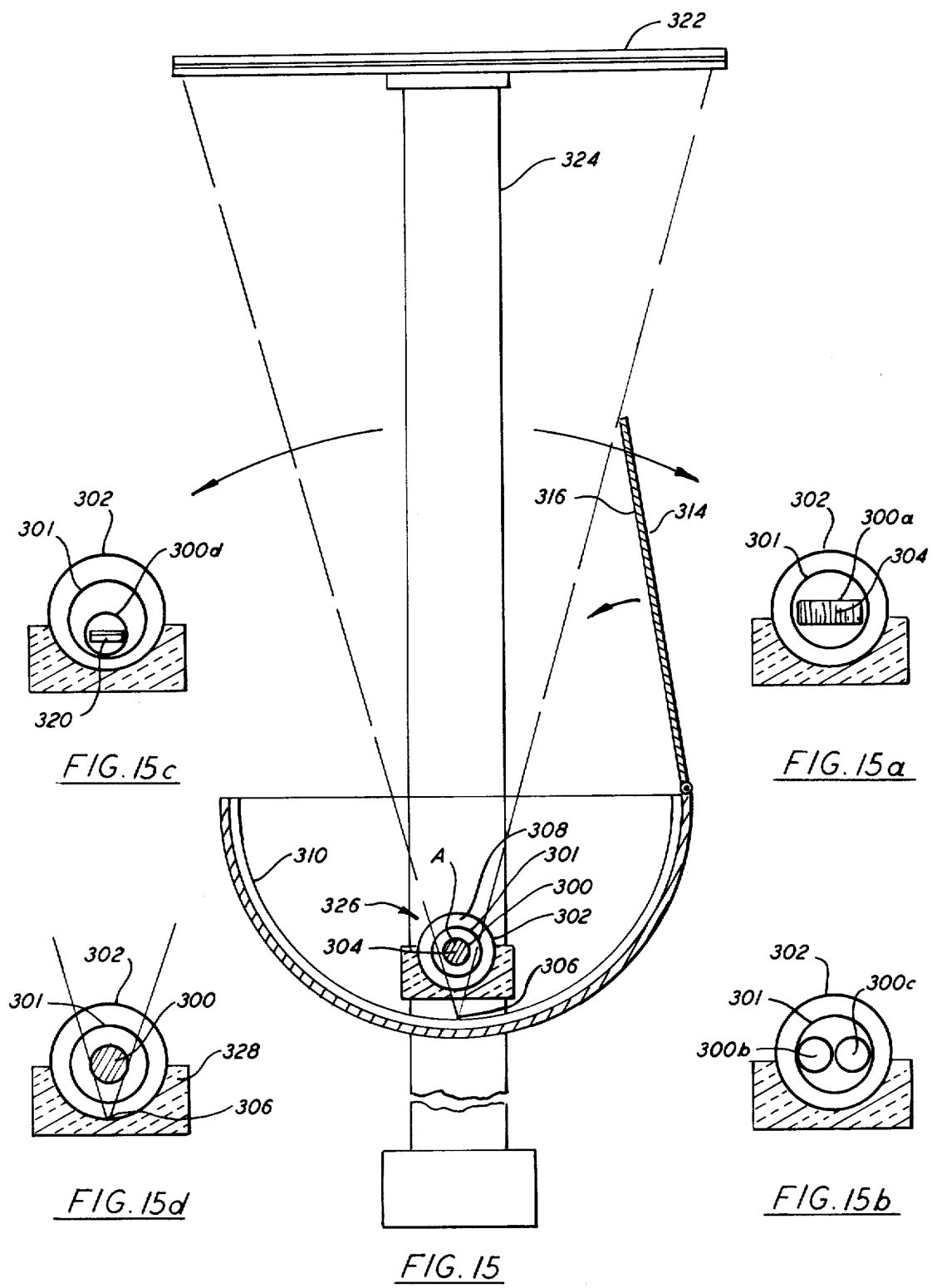
FIG. 15 shows an alternate embodiment with only two inserted conduits with two fluids and controlled circulation in each conduit.
Figure 16:
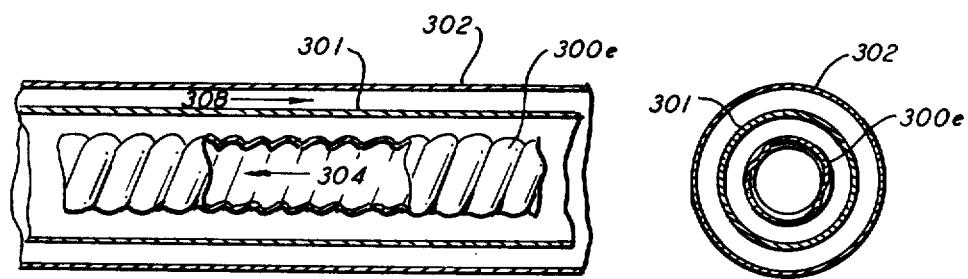
FIG. 16 is a cross section of a tube similar to that of FIG. 15 in which the inner tube has a corrugated section.

FIG. 15 shows an alternate embodiment to the previous disclosures utilizing two conduits inserted in each other instead of three conduits. The inside tube 300 is a metallic conduit blackened on the outside surface with a material corrosion resistant to the fluid flowing around it. The outside conduit 302 is transparent, preferably Pyrex glass.

A fluid 304 with a boiling point of over 300° C. flows with controlled circulation in the inside tube 300 and is heated by solar energy with a focus 306 on or under this tube 300. A fluid 308 circulates with controlled flow rate between the conduits 300 and 302.

A reflective aluminized mirror 310 is installed below the tube assembly and backed by insulating material 312. The mirror will reflect scattered solar rays from the Fresnel lenses and direct rays into the tube assembly and increase the solar energy collection and concentration. A security panel 314 aluminized on one surface 316 will be provided and will drop automatically on the collector in case of overpressure or overtemperature at selected levels in order to prevent further solar heating in such accidental cases. A counterweight 318 is attached by the supports 320 at each end of the unit.

The Fresnel lens 322 with a frame 324, the supports 320, the mirror 310 and the counterweight 318 rotates from East to West around the axis (A) of the inside tube 300 to track the elevation position of the sun. The tube assembly 326 will remain stationary. A reversing electric motor brings the rotating system to the initial morning location by contacting a limit switch.

Instead of one, several Fresnel lenses can be provided with proper grooves in order to allow the concentration in one common focus track.

FIG. 15a shows a similar arrangement with a rectangular blackened metallic conduit 300a instead of round; this will allow a larger focus track.

FIG. 15b shows a similar arrangement but with two adjacent round blackened metallic conduits 300b and 300c inserted in the outside conduit.

FIG. 15c shows a similar arrangement in which the inside tube 300d is transparent and an array 320 of photovoltaic cells encapsulated in glass, plastic or similar material is installed in the inside tube 300d with fluid circulating in both tubes.

FIG. 15d shows a similar arrangement but without a reflective mirror and with insulation 328 around the outside conduit 302 except for the upper part allowing transmission of solar rays to the focus 306. The insulating unit and tube assembly will be stationary whereas the other items are rotating as shown above.

FIG. 6 shows an additional embodiment of the present invention in which a metallic inside conduit 300e preferably has corrugated sections so as to cause turbulent flow of the fluid 304. The inside conduit 300e will preferably be 20 mm OD. Its outside surface will be darkened by electroplating preferably with chrome black in order to have an emission of radiation of less than 10% and an absorbance factor of 90%.

The corrugated section can be welded on both sides of the conduits before electroplating.

Figure 17:
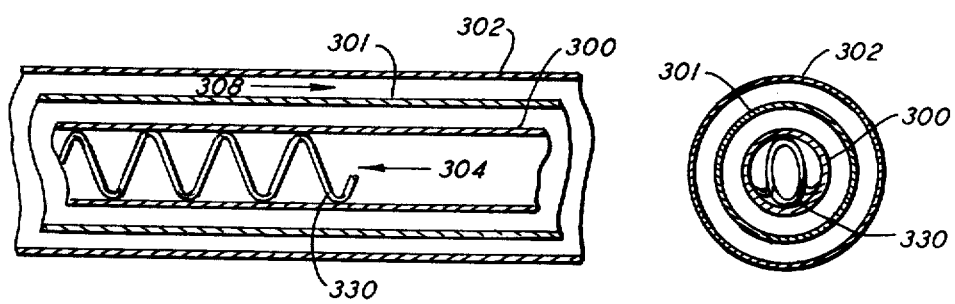
FIG. 17 is a similar view in which means to increase turbulence are inserted inside the inner tube.

FIG. 17 illustrates another manner of obtaining turbulence of circulation to increase the heat exchange. In this embodiment, in the inside of the conduit 300, means such as springs 330 are introduced which will cause turbulence 330 of fluid 304 without affecting the circulation of the outside fluid 308 thus not increasing the heat exchange with the ambient.

The irradiation on the collecting surface of the lenses described above depends not only on the daily position of the sun but also on the season and the latitude of the locations.

The lenses have to be tilted at an optional angle as compared to a horizontal surface which depends on the latitude and the season.

The apparatus for distillation of water as shown in FIG. 1, has Fresnel lenses concentrating the solar energy which can be made movable not only for tracking (E.W.) but also orientable by either manual or automatic means so to change the tilting as the seasons change to obtain optimum irradiation, which may vary, with the season.

This orientation of the Fresnel lenses can be made without interference with the rest of the distillation unit since such lenses are installed above the double plates with tight ends so that the water vapor does not enter the space between the double plate and the lenses.

These provisions can also be used for other applications of the solar system.

Figure 18:
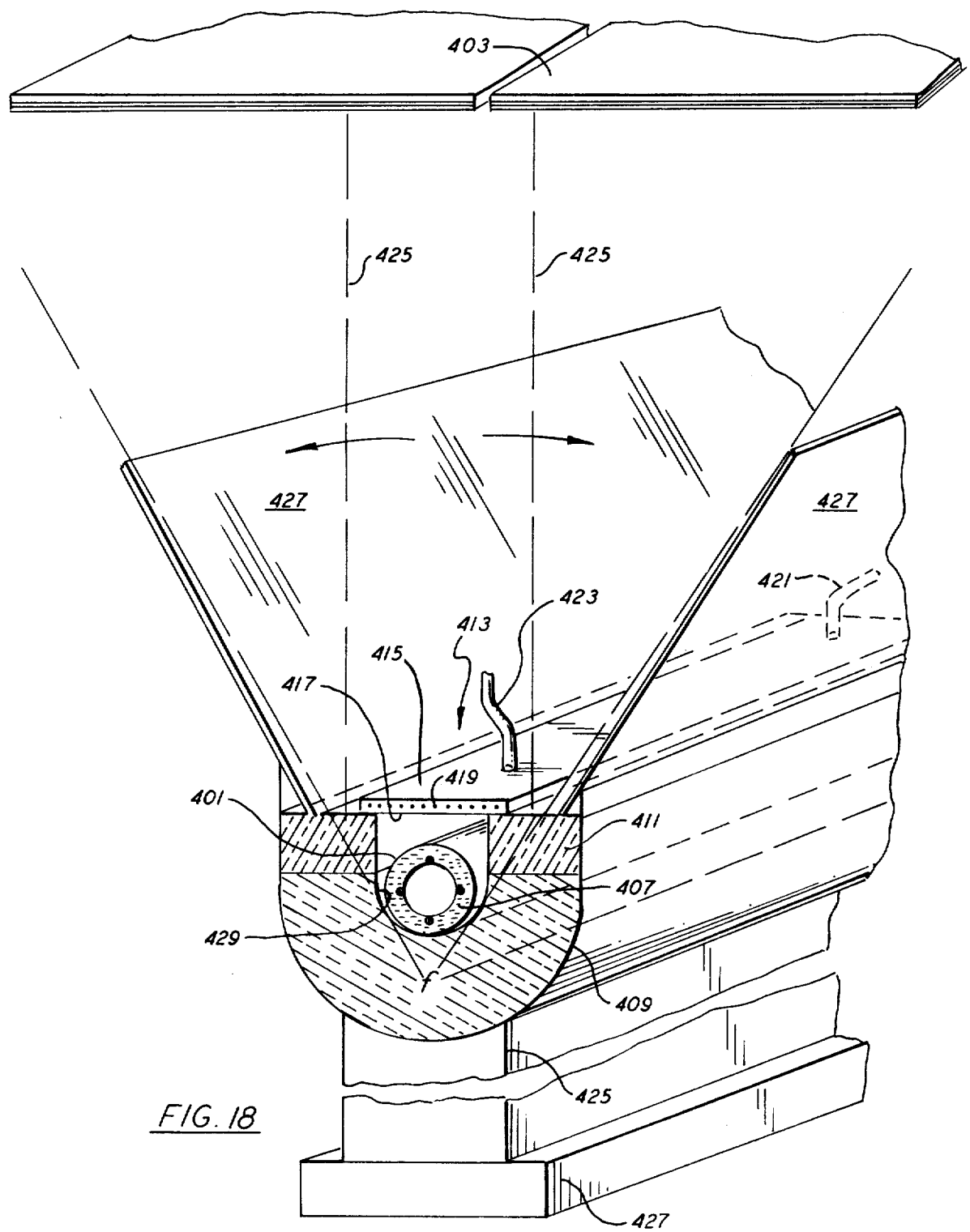
FIG. 18 is a perspective schematic view of a further system according to the present invention using an insulated tube covered by spaced transparent plates and enclosed with insulation at its bottom portion.

Another embodiment of the present invention is illustrated by FIG. 18. In this embodiment, energy is collected primarily within the tube 401 onto which concentrated solar energy collected by a Fresnel lens 403 is directed. The tube 401, assuming it is to perform the function of heating a circulating fluid such as Therminol, will preferably be a metal tube with its outside surface darkened by electroplating, preferably with chrome black. Shown in the embodiment of FIG. 18, within the tube 401 is another metalic tube 405 containing rings or other means to obtain a turbulant flow of the fluid 407 which is to be heated. The lower portion of the tube 401 is surrounded by insulation 409. A cover structure 411, the side portions of which are preferably transparent, supports a double plate system 413, which includes an upper plate 415 and a lower plate 417 above tube 401. The sides of the plate are sealed in the manner described above in connection with FIG. 1a. A second fluid 419 is circulated between the plates 415 and 417, there being provided an inlet 421 and an outlet 423 connected to flexible tubing, for example, for this purpose. As in previously described embodiments there are supports 425 supporting the Fresnel lens 403 above the tube 401. These supports 425, in addition, support the insulation 409 and cover 411 with the plate assembly 413 thereon. The supports 425 extend below the insulation 409 and there is attached a counter weight 427 in the manner previously described. Also illustrated are reflective panels 427 angled upward from the cover 411. Reflective panels 427 can be made of aluminum and silvered on their surface. In the preferred embodiment all elements of the system, except for the pipe 401 and whatever pipe is inside it, rotate to follow the sun. As in previously described embodiments, rotation is about the axis of the pipe 401. In view of this, the insulation 409 is preferably of light foam to aid in permitting ease of rotation about the tube 401. In addition, it is preferred that a reflective paper 429 such as aluminum foil be disposed between the insulation and the pipe 401. Furthermore, it is preferred that the reflective panels 427 be rotatable to act as protective safety shields much in the manner of the panels 195 of FIG. 11 to block the solar energy if impermissible temperatures are reached within the pipe 401.

In operation, solar energy is focused by the Fresnel lens 403 on a focus located in or below the pipe 401. Scattered energy is reflected by the reflective panels 427 onto this area. Typically, the double plate 413 is spaced about 10 mm from the tube 401 at its closest distance. The double plates can have a width of 30 to 60 mm or larger. The positioning of the plates and the fluid flowing therein performs a function similar to the fluid flowing between the outer and intermediate tubes in previously disclosed systems. The space between the double plate system 413 and the tube 401 forms an air insulation space corresponding in function to the air insulation space between the inner and intermediate tubes in previous embodiments. However, particularly in an embodiment utilizing a blackened metal pipe, the present embodiment offers significant advantages, in that only metal pipe sections need be connected together as opposed to the requirement in the other embodiments for connection of transparent glass pipes, for example, which require expansion joints.

At the same time, improved freedom from heat loss is achieved. The fluid 407 within the tube 401 will be a fluid capable of being heated to a high temperature of, for example, 200° C., such as Therminol. In such a tube carrying a high temperature fluid there will be heat losses due to radiation and convection. The radiation heat loss, $E_R$ in kilowatt hours equals $$56.7 \times e \times S \times \frac{(T)^4}{1000},$$

where e is the emissivity factor, S the surface area, and T the absolute temperature at the surface area. The heat loss by convection $E_c$ equals $f \times dt \times S$, where F is a factor which depends on wind and varies between 6 and 24 for winds between 10 and 25 miles per hour, dt is the temperature difference between the surface and the outside air and S is again the surface area.

By providing the insulation 409 around a large portion of the tube, heat losses are proportionally reduced with the reduction of the exposed surface area S. Furthermore, the heat of radiation and convection are also absorbed by the fluid 419 flowing between the plates 415 and 417. This results in the heating of this fluid. In addition, the insulating effect of the air space below the plate system 413 aids in preventing heat loss. Thus, the heat loss will be primarily the heat loss from the upper plate 415 of the plate system 413. Since the fluid in the space between these plates is at a lower temperature, for example 60° C., the temperature differential dt between the fluid and the ambient air will be much less than it would be if the pipe 401 was exposed to the ambient air. Furthermore, its surface area is smaller than that of the hotter tube 401. Thus, reduced heat losses are experienced. In the manner described in my previously mentioned co-pending applications and herein, the circulation of the fluids 419 and 407 should be controlled so as to maintain desired temperatures within the tube 401 and the plate system 413 respectively, again, typical examples are temperatures of 200° C. within the tube 401 and 60° C. in the plate system.

In addition to the use of a blackened tube 401, the system can also be adapted for generating electrical energy using photovoltaic cells in which case tube 401 must be transparent. Whereas in the case of the blackened tube for heating a fluid, such fluid should be something such as Therminol or a similar fluid, in the case of photovoltaic cells distilled water is used. In both cases, the fluid circulating in the double plate system 413 may be a mixture of distilled water and glycol.

This system may also be utilized for the distillation of water much in the manner illustrated in connection with FIG. 5 and FIG. 5a, the primary difference being that only a single inner tube is used with the plate system 413 performing the function of the other tubes. In the case of water distillation and in the case of electrical energy production from photovoltaic cells, both of which functions can be combined much in the manner disclosed in connection with FIG. 5, the tube 401 will, of course, have to be a transparent tube, furthermore, in such cases the inner tube 405 which aids in obtaining a turbulent flow for better heat transfer is not used.

In addition, the portion of this system including the tube 401 and whatever is inside, the insulation 409, cover 411 and double plate system 413 with or without panels 427, can instead be installed in a system such as that shown in FIGS. 9 and 10, i.e., one in which tracking is carried out by moving the Fresnel lenses on a sinusoidal railing.

What is claimed is:
1. Apparatus for recovering energy from the sun comprising:
    (a) means for conducting a first fluid comprising water to be distilled;
    (b) linear lens means having a focal length f, said lens means located a distance less than f from said means for conducting and arranged so as to direct concentrated solar energy on said means for conducting with the focus of said lens means on or below said means for conducting;
    (c) conduit means transparent to visible light interposed between said means for conducting and said lens means;
    (d) means supplying a second fluid comprising a cooling fluid to said conduit means for assisting the condensation on said conduit means of water evaporated from said means for conducting;
    (e) means for collecting the condensed water; and
    (f) at least one array of photovoltaic cells disposed in said means for conducting at a location of the concentration of solar energy by said lens means.
2. Apparatus for recovering energy from the sun comprising:
    (a) means for conducting a first fluid comprising water to be distilled, said means for conducting comprising an undulated plate system;
    (b) linear lens means having a focal length f, said lens means located a distance less than f from said means for conducting and arranged so as to direct concentrated solar energy on said means for conducting with the focus of said lens means on or below said means for conducting, said lens means comprising at least one linear lens aligned so as to direct its energy onto said plate system;
    (c) conduit means transparent to visible light interposed between said means for conducting and said lens means, said conduit means comprising a double plate conduit having an upper and a lower plate interposed between said linear lens and said undulated plate system,
    (d) means supplying a cooling fluid comprising distilled water to said conduit means for assisting the condensation thereon of water evaporated from said means for conducting; and
    (e) means for collecting the condensed water, the first fluid conducted over said means for conducting and said cooling fluid.
3. Apparatus according to claim 1 and further including means encapsulating said array and means supplying a cooling fluid around said encapsulating means to cool said array.
4. Apparatus according to claim 3 wherein said cooling fluid comprises distilled water.
5. Apparatus for recovering energy from the sun comprising:
    (a) means for conducting a first fluid comprising water to be distilled, said means for conducting comprising a first transparent tube;
    (b) linear lens means having a focal length f, said lens means located a distance less than f from said means for conducting and arranged so as to direct concentrated solar energy on said means for conducting with the focus of said lens means on or below said means for conducting;
    (c) conduit means transparent to visible light interposed between said means for conducting and said lens means comprising a second transparent tube surrounding said first transparent tube;

(d) means supplying a cooling fluid comprising distilled water to said second transparent tube, said cooling fluid being circulated between said tubes for assisting condensation of water being evaporated on the inside of said first tube; and (e) means for collecting the condensed water, the first fluid conducted through said first transparent tube and said cooling fluid.

6. Apparatus according to claim 5 and further including means to cause said lens to track the movement of the sun, said means adapted to rotate said lens about an axis concentric with the axis of said first tube, said lens being adapted to direct its radiation along said tubes with its focal point below the bottom of said tube assembly.

7. Apparatus according to claim 5 and further including an array of photovoltaic cells disposed in said first tube.

8. Apparatus according to claims 4 or 7 wherein said distilled water comprises the cooled condensate obtained from said water being distilled.

9. Apparatus according to claim 7 and further including means encapsulating said array and means supplying a cooling fluid around said encapsulating means to cool said array.

10. Apparatus according to claim 7 and further including a curved mirrored surface below said tube assembly and means for moving said lens and said mirrored surface together to track the sun, said tube assembly remaining fixed.

11. Apparatus according to claim 10 and further including insulation disposed about the lower part of said tube assembly.

12. Apparatus according to claim 1 wherein
(a) said means for conducting comprise an undulated plate system;
(b) said lens means comprise at least one linear lens aligned so as to direct its energy onto said plate system; and
(c) said conduit means comprise a double plate conduit having an upper and a lower plate interposed between said linear lens and said undulated plate system.

13. Apparatus according to claims 12 or 2 and further including an insulating base plate below said plate system.

14. Apparatus according to claims 12 or 2 and further including at least one storage means disposed below said insulating plate for storing fluids used in said apparatus.

15. Apparatus according to claim 12 or 2 wherein said plates have an undulation with a depth on the order of up to 90 mm and are separated by approximately 120 mm and have a black coating.

16. Apparatus according to claim 15 wherein said plate system is made out of metal selected from the group consisting of stainless steel, steel and copper.

17. Apparatus according to claim 15 wherein said plate system is covered with a material of anticorrosive nature.

18. Apparatus according to claim 12 or 2 wherein said plates are made of a material selected from the group consisting of asbestos fiber, tightened precast concrete, glass and plastic.

19. Apparatus according to claim 12 or 2 and further including a blackened flexible material disposed over at least part of said plates in a manner such that it is removable to permit removing deposits therefrom.

20. Apparatus according to claim 12 or 2 and further including means supporting said lenses to track the location of the sun.

21. Apparatus according to claim 12 or 2 and further including at least one array of photovoltaic cells installed in one of the valleys of the undulations in alignment with the focal track of one of said lens means.

22. Apparatus according to claim 1 wherein said conduit means comprise a double plate conduit having an upper and lower plate interposed between said lens means and said means for conducting, the longitudinal sides of said plates fully obstructed by a joint, with only part of the plates obstructed along their width leaving a small free outlet space so to allow a wide spread of fluid along the surface between the plates.

23. Apparatus for recovering energy from the sun comprising:
(a) means for conducting a first fluid;
(b) linear lens means having a focal length f, said lens means located a distance less than f from said means for conducting and arranged so as to direct concentrated solar energy on said means for conducting with the focus of said lens means on or below said means for conducting;
(c) conduit means transparent to visible light interposed between said means for conducting and said lens means, said conduit means comprising a double plate conduit having an upper and lower plate interposed between said lens means and said means for conducting, the longitudinal sides of said plates fully obstructed by a joint, with only part of the plates being obstructed along their width leaving a small free outlet space so as to allow a wide spread of fluid along the surface between the plates.

24. Apparatus according to claims 10 or 23 and further including a tank filled with said second fluid disposed above said conduit so to maintain a constant pressure of about 40 cm of water column between said double plates.

25. Apparatus according to claim 1 wherein said means for conducting a first fluid comprise a tube, said conduit means transparent to visible light comprise a pair of spaced plates having an inlet and an outlet, and further including insulation surrounding the lower portion of said tube; and cover means over said insulation supporting said spaced plates above said tube with an air space therebetween.

26. Apparatus for recovering energy from the sun comprising:
(a) a tube for conducting a first fluid;
(b) insulation surrounding the lower portion of said tube;
(c) elongated linear lens means having a focal length f, said lens means located a distance approximately equal to f from said tube and arranged so as to direct concentrated solar energy on said tube, the focus of said len means being in or on and substantially along said tube;
(d) conduit means transparent to visible light interposed between said tube and said lens means, said conduit means comprising a pair of spaced plates having an inlet and an outlet;
(e) means for supporting said spaced plates above said tube with a space between the tube and the spaced plates; and (f) means supplying a second fluid to said conduit means.

27. Apparatus according to claims 25 or 26, and further including a reflective paper between said insulation and said tube.

28. Apparatus according to claims 25 or 26, wherein said linear lens means comprises a Fresnel lens and further including:
   (a) a frame for supporting said lens, said insulation, said cover means, and said spaced plates for rotation about the axis of said tube; and
   (b) a counterweight attached to said frame to balance the weight of said Fresnel lens.

29. Apparatus for recovering energy from the sun comprising:
   (a) an undulated plate system for conducting flow of water to be distilled;
   (b) lens means arranged so as to direct concentrated solar energy on said plate system;
   (c) a double plate conduit having upper and lower plates transparent to visible light interposed between said plate system and said lens means; and
   (d) means supplying a cooling fluid to said conduit to assist condensation thereon of water evaporated from said plate system; and
   (e) means for collecting the condensed water, water to be distilled conducted on said plate system and said cooling fluid.

30. Apparatus according to claim 29 wherein said plate system has undulations with a depth on the order of up to 90 mm separated by approximately 120 mm.

31. Apparatus according to claim 30 wherein said plate system is made out of a blackened metal and covered with an anticorrosive material.

32. Apparatus according to claim 29 wherein said plate system is made of a material selected from the group consisting of blackened asbestos cement, watertight precast concrete, glass and plastic.

33. Apparatus according to claim 29 and further including at least one storage means disposed below said insulating plate for storing fluids used in said apparatus.

34. Apparatus according to claim 29 and further including means supporting said lenses to track the location of the sun.

35. Apparatus according to claim 29 and further including at least one array of photovoltaic cells installed in one of the valleys of the undulations above the focus of one of said lens means.

36. Apparatus for recovering energy from the sun comprising:
   (a) means for conducting a first fluid comprising water to be distilled;
   (b) linear lens means having a focal length f, said lens means located a distance less than f from said means for conducting and arranged so as to direct concentrated solar energy on said means for conducting with the focus of said lens means on or below said means for conducting;
   (c) conduit means transparent to visible light interposed between said means for conducting and said lens means;
   (d) means for supplying a cooling fluid comprising distilled water to said conduit means for assisting the condensation thereon of water evaporated from said means for conducting;
   (e) means for collecting the condensed water, the first fluid conducted over said means for conducting and said cooling fluid; and
   (f) an array of photovoltaic cells disposed in said means for conducting at a location of the concentration of solar energy by said lens means, means encapsulating said array and means supplying a cooling fluid comprising distilled water to said encapsulating means to cool said array.

* * * * *

UNITED STATES PATENT AND TRADEMARK OFFICE
CERTIFICATE OF CORRECTION

PATENT NO. : 4,323,052

DATED : April 6, 1982

INVENTOR(S) : Virgil Stark

It is certified that error appears in the above—identified patent and that said Letters Patent is hereby corrected as shown below:

Column 1, line 20, change "4,194,948" to --4,194,949--;

line 34, change "appliction" to --application--;

line 37, change "distallation" to --distillation--.

Column 3, line 62, change "system" to --systems--.

Column 5, line 50, after "much" insert --as--.

Column 7, line 51, change "optiminzation" to --optimization--.

Column 8, line 4, change "used" to --use--.

Column 11, line 18, change "rach" to --reach--;

line 55, change "Figs." to --Fig.--.

UNITED STATES PATENT AND TRADEMARK OFFICE
CERTIFICATE OF CORRECTION

PATENT NO. : 4,323,052
DATED : April 6, 1982
INVENTOR(S) : Virgil Stark

It is certified that error appears in the above—identified patent and that said Letters Patent is hereby corrected as shown below:

Column 13, line 11, change "applications" to --application--.

Column 14, line 8, change "fluiid" to --fluid--.

Column 15, line 30, change "interconnet" to --interconnect--;

line 67, change "cnetral" to --central--.

Column 21, line 33, change "6" to --16--.

Column 22, line 12, change "metalic" to --metallic--.

Column 25, line 21, (claim 8, line 1), change "4 or 7" to --4 or 36--.

UNITED STATES PATENT AND TRADEMARK OFFICE
CERTIFICATE OF CORRECTION

PATENT NO. : 4,323,052
DATED : April 6, 1982
INVENTOR(S) : Virgil Stark

It is certified that error appears in the above—identified patent and that said Letters Patent is hereby corrected as shown below:

Column 26, line 38, (claim 24, line 1), change "10 or 23" to --22 or 23--.

Column 27, line 17, after "conducting" insert --a--.

*Signed and Sealed this*

*Fourteenth* Day of *September 1982*

[SEAL]

*Attest:*

*Attesting Officer*

GERALD J. MOSSINGHOFF
*Commissioner of Patents and Trademarks*